United States Patent
Hong et al.

(10) Patent No.: US 9,167,211 B2
(45) Date of Patent: Oct. 20, 2015

(54) METHOD FOR TRANSMITTING AN IPTV STREAMING SERVICE BY P2P TRANSMISSION, AND METHOD FOR RECEIVING AN IPTV STREAMING SERVICE BY P2P TRANSMISSION

(75) Inventors: Ho Taek Hong, Seoul (KR); Jong Yeul Suh, Seoul (KR); Thomas Stockhammer, Bergen (DE); Jae Hyung Song, Seoul (KR); Jin Pil Kim, Seoul (KR); Kyung Ho Kim, Seoul (KR); Joon Hui Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 774 days.

(21) Appl. No.: 13/265,251

(22) PCT Filed: Apr. 20, 2010

(86) PCT No.: PCT/KR2010/002444
§ 371 (c)(1),
(2), (4) Date: Oct. 19, 2011

(87) PCT Pub. No.: WO2010/123248
PCT Pub. Date: Oct. 28, 2010

(65) Prior Publication Data
US 2012/0042092 A1 Feb. 16, 2012

Related U.S. Application Data

(60) Provisional application No. 61/170,664, filed on Apr. 20, 2009, provisional application No. 61/171,850, filed on Apr. 23, 2009, provisional application No. 61/178,061, filed on May 14, 2009.

(51) Int. Cl.
G06F 15/16 (2006.01)
H04N 7/173 (2011.01)
(Continued)

(52) U.S. Cl.
CPC ....... *H04N 7/17318* (2013.01); *H04N 21/4788* (2013.01); *H04N 21/47202* (2013.01); *H04N 21/6125* (2013.01); *H04N 21/64322* (2013.01)

(58) Field of Classification Search
USPC ......................................... 709/217
See application file for complete search history.

(56) References Cited

U.S. PATENT DOCUMENTS 7,415,528 B2 * 8/2008 Choi et al. ............... 709/231
8,300,530 B2 * 10/2012 Chew et al. ............. 370/235
(Continued)

FOREIGN PATENT DOCUMENTS

| EP | 2071850 A1 * | 6/2009 | .......... H04N 7/24 |
| KR | 10-2008-0071818 | 8/2008 | |
| WO | WO 2007013026 A2 * | 2/2007 | .......... H04L 29/06 |
| WO | WO 2008/012488 A2 | 1/2008 | |

OTHER PUBLICATIONS

DVB Organization: "IPI2518r10-basis for ts 102034 1_4_1 r1_5 (clean)_changeRequest_r1.doc", DVB, Digital Video Broadcasting, c/o EBU-17A Ancienne Route—CH-1218 Grand Saconnex, Geneva—Switzerland, Feb. 20, 2009, XP017811359.
(Continued)

*Primary Examiner* — Alicia Baturay
(74) *Attorney, Agent, or Firm* — Dentons US LLP

(57) ABSTRACT

According to one embodiment of the present invention, a method for transmitting an IPTV streaming service by P2P transmission comprises the steps of collecting TS packets of n skipped units to generate an encapsulation unit for an IPTV streaming service (where n is a natural number); adding an extension header containing type information to the generated encapsulation unit (wherein, said type information is information for identifying the sequence of the encapsulation unit, which is required for decoding the IPTV streaming service); adding an IP header to the encapsulation unit to which the extension header containing the type information is added, in order to generate an IP packet; and transmitting the generated IP packet to at least one super peers.

14 Claims, 43 Drawing Sheets

(51) Int. Cl.
*H04N 21/472* (2011.01)
*H04N 21/4788* (2011.01)
*H04N 21/61* (2011.01)
*H04N 21/643* (2011.01)

(56) References Cited

U.S. PATENT DOCUMENTS

| | | | | |
|---|---|---|---|---|
| 8,577,992 | B1 * | 11/2013 | Richardson et al. | 709/217 |
| 2008/0022012 | A1 * | 1/2008 | Wang | 709/238 |
| 2008/0049720 | A1 * | 2/2008 | Liu et al. | 370/352 |
| 2008/0144621 | A1 | 6/2008 | Huang | |
| 2010/0189122 | A1 * | 7/2010 | Dandekar et al. | 370/412 |

OTHER PUBLICATIONS

DVB Organization: "DVB-S2 Guidelines.doc", DVB, Digital Video Broadcasting, c/o EBU-17A Ancienne Route—CH-1218 Grand Saconnex, Geneva—Switzerland, Mar. 12, 2004, XP017813448.

Tesanovic M et al: "Combating error bursts for enhanced video transmission using cross-packet FEC and description interleaving", Visual Communications and Image Processing; Jan. 29, 2008-Jan. 31, 2008; San Jose, Jan. 29, 2008, XP030081211.

Y-K Wang Huawei Technologies R Even Self-Employed T Kristensen Tandberg: "RTP Payload Format for H.264 Video; draft-ietf-avt-rtp-rfc3984bis-04.txt", RTP Payload Format for H.264 Video; Draft-ietf-avt-rtp-rfc3984bis-04.txt, Internet Engineering Task Force, IETF; Standardworkingdraft, Internet Society (ISOC) 4, Rue Des Falaises CH—1205 Geneva, Switzerland, vol. avt, No. 4, Mar. 6, 2009), XP015060724.

Susu Xie et al: "Coolstreaming: Design, Theory, and Practice", IEEE Transactions on Multimedia, IEEE Service Center, Piscataway, NJ, US, vol. 9, No. 8, Dec. 1, 2007, pp. 1661-1671, XP011346493, ISSN: 1520-9210, DOI: 10.1109/TMM.2007.907469.

Ying Huang et al: "Model Analyses on Message Stream Transmission in P2P-SIP", Networking, Sensing and Control, 2008. ICNSC 2008. IEEE.

International Conference on, IEEE, Piscataway, NJ, USA, Apr. 6, 2008, pp. 1372-1375, XP031255382.

\* cited by examiner

FIG. 30

```
<Content>
<Title>Vickey Cristina Barcelona</Title>
<Picture>http://www.barcelona.com/film/vickey/post.jpg</Picture>
<Rating>PG-13</Rating>
<Duration>96 mins</Duration>
<Description>Vicky Cristina Barcelona(2008) : Set against the luscious
Mediterranean sensuality of Barcelona
</Description>
<Size>1029MB</Size>
<Peers>4530</Peers>
<Price>0</Price>
</Content>
<Content>
<Title>SexyFantasy Shoot1</Title>
<Picture></Picture>
<Rating>TVMA</Rating>
<Dutation>6 mins</Dutation>
<Descrition>The Provocative woman of "Fantasy" at the Luxor, voted
the best topless show in Las Vegas
</Descrition>
<Peers>3230</Peers>
<Price>0</Price>
</Content>
```

FIG. 38

```
<?xml version="1.0" encoding-"UTF-8?>
<superpeerlist>
<superpeeritem>
    <Name> Europe P2P SuperPEER #1 </Name>
    <SuperPEERURI> http://p2p.europe1-superpeer1.de </SuperPEERURI>
    <Address> europe1.superpeer1.de </Address>
    <Port> 4325 </Port>
    <Description> This is the 1st superpeer in Europe. We are serving many
SD live contents from European Broadcast System. </Description>
</superpeeritem>
<superpeeritem>
    <Name> Europe P2P SuperPEER #2 </Name>
    <SuperPEERURI> http://p2p.europe1-superpeer2.de </SuperPEERURI>
    <Address> europe1.superpeer2.de </Address>
    <Port> 4325 </Port>
    <Description> This is the 2nd superpeer in Europe. We are serving many
SD live contents from European Broadcast System. </Description>
</superpeeritem>
</superpeerlist>
```

METHOD FOR TRANSMITTING AN IPTV STREAMING SERVICE BY P2P TRANSMISSION, AND METHOD FOR RECEIVING AN IPTV STREAMING SERVICE BY P2P TRANSMISSION

This application is a National Stage Entry of International Application No. PCT/KR2010/002444, filed on Apr. 20, 2010, and claims the benefit of U.S. Provisional Applications 61/170,664, filed Apr. 20, 2009, 61/171,850, filed Apr. 23, 2009 and 61/178,061 filed May 14, 2009, all of which are hereby incorporated by reference for all purposes as if fully set forth herein in their entireties.

TECHNICAL FIELD

The present invention relates to an IPTV streaming service, and more particularly, to a method for transmitting an IPTV streaming service by P2P transmission and a method for receiving an IPTV streaming service by P2P transmission.

BACKGROUND ART

A conventional TV broadcasting service is provided in such a manner that contents produced by broadcasting stations are transmitted through transmission media such as terrestrial, cable, satellite, etc., and viewers watch the contents through TV receivers capable of receiving signals transmitted by means of the transmission media. However, as digital TV technology substituting the conventional analog broadcast technology has been developed and commercialized, a variety of contents including real-time broadcast, CoD (Contents on Demand), games, news, etc. can be provided to viewers using the Internet connected to each home in addition to the conventional transmission media. An example of providing contents using the Internet is IPTV (Internet Protocol TV).

However, it is inevitable that traffic is concentrated on a content provider, and this traffic concentration causes transfer rate reduction and service quality deterioration.

DISCLOSURE

Technical Problem

It is an aspect of the present invention to provide a method for enabling an IPTV receiver to receive contents from a server or another broadcast receiver by P2P (Peer-to-Peer) to disperse network traffic, thereby providing a more efficient and convenient broadcast environment to users.

It is another aspect of the present invention to newly define P2P technology for an IPTV streaming service, distinguished from the conventional P2P technology focused on file transmission.

Technical Solution

The objects of the present invention can be achieved by providing a method for transmitting an IPTV (Internet Protocol Television) streaming service by P2P (Peer to Peer) transmission, the method comprising the steps of collecting TS (Transport Stream) packets of n skipped units to generate an encapsulation unit for the IPTV streaming service (where n is a natural number), adding an extension header containing type information to the generated encapsulation unit, wherein the type information is information for identifying the sequence of the encapsulation unit, which is required for decoding the IPTV streaming service, adding an IP header to the encapsulation unit to which the extension header containing the type information is added, in order to generate an IP packet, and transmitting the generated IP packet to one or more super peers.

The mother matrix may be generated using a Costas array. A method for receiving an IPTV (Internet Protocol Television) streaming service by P2P (Peer to Peer) transmission, the method comprising the steps of receiving an IP packet composed of an encapsulation unit for the IPTV streaming service to which an extension header containing type information is added and an IP header added to the encapsulation unit from a super peer or another peer, wherein the type information is information for identifying the sequence of the encapsulation unit, which is required for decoding the IPTV streaming service, rearranging TS packets constructing the encapsulation unit in an original sequence using the type information, and decoding the rearranged TS packets to output the IPTV streaming service.

Advantageous Effects

According to an embodiment of the present invention, an IPTV receiver receives contents from a server or another broadcast receiver by P2P (Peer-to-Peer) to disperse network traffic, thereby providing a more efficient and convenient broadcast environment to users.

Furthermore, according to another embodiment of the present invention, problems of the conventional P2P technology focused on file transmission are solved, and P2P technology for an IPTV streaming service is newly defined.

DESCRIPTION OF DRAWINGS

FIG. 30 shows exemplary metadata of a content list for P2P IPTV streaming according to another embodiment of the present invention;

FIG. 38 shows exemplary metadata of a super peer list for P2P IPTV streaming;

BEST MODE FOR CARRYING OUT THE INVENTION

Reference will now be made in detail to the preferred embodiments of the present invention with reference to the accompanying drawings. However, the present invention is not limited or restricted by the embodiments.

Though the terms used in the following description are terms currently widely used and defined taking into consideration the functions obtained in accordance with the present invention, they may be varied depending on the intention of an engineer in the art, usual practice, or the advent of new technology. Furthermore, terms arbitrarily selected by Applicant may be used in a specific case and, in this case, the meaning thereof will be specified in the corresponding description part. Therefore, terms used in the following description should be interpreted on the basis of substantial meaning thereof and the whole content of this specification.

An IPTV service uses centralized file distribution. In other words, when receiver terminals are informed of locations of contents, the receiver terminals are connected to a server allowed to be accessed to receive services and contents. When the IPTV service is provided to the receiver terminals in this manner, network traffic is concentrated on a server in which contents are located. Accordingly, the present invention proposes a method for downloading contents to reduce the network traffic and efficiently transmit data including contents.

The present invention describes a method for providing and receiving data using P2P delivery in the IPTV service. IPTV may be designated as a HNED (Home Network End Device), ITF (IPTV Terminal Function), peer, etc. hereinafter.

Figure 1:
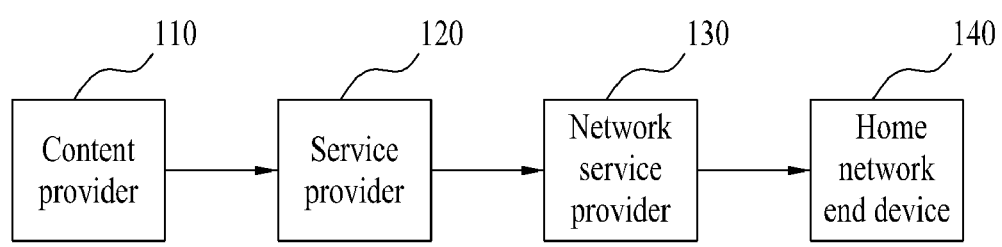
FIG. 1 is a block diagram of a conventional IPTV system over managed network.

FIG. 1 is a block diagram of a conventional IPTV system over managed network. The conventional IPTV system over managed network will now be explained with reference to FIG. 1.

In general, a network operator provides the IPTV service and manages bandwidths and transmission paths for the IPTV service. For example, as shown in FIG. 1, data is sequentially delivered through a CP (Content Provider) 110, a SP (Service Provider) 120, a NSP (Network Service Provider) 130, and a HNED (Home Network End Device) 140. When the IPTV service is provided by the NSP in the structure as shown in FIG. 1, a new operator is difficult to join.

Figure 2:
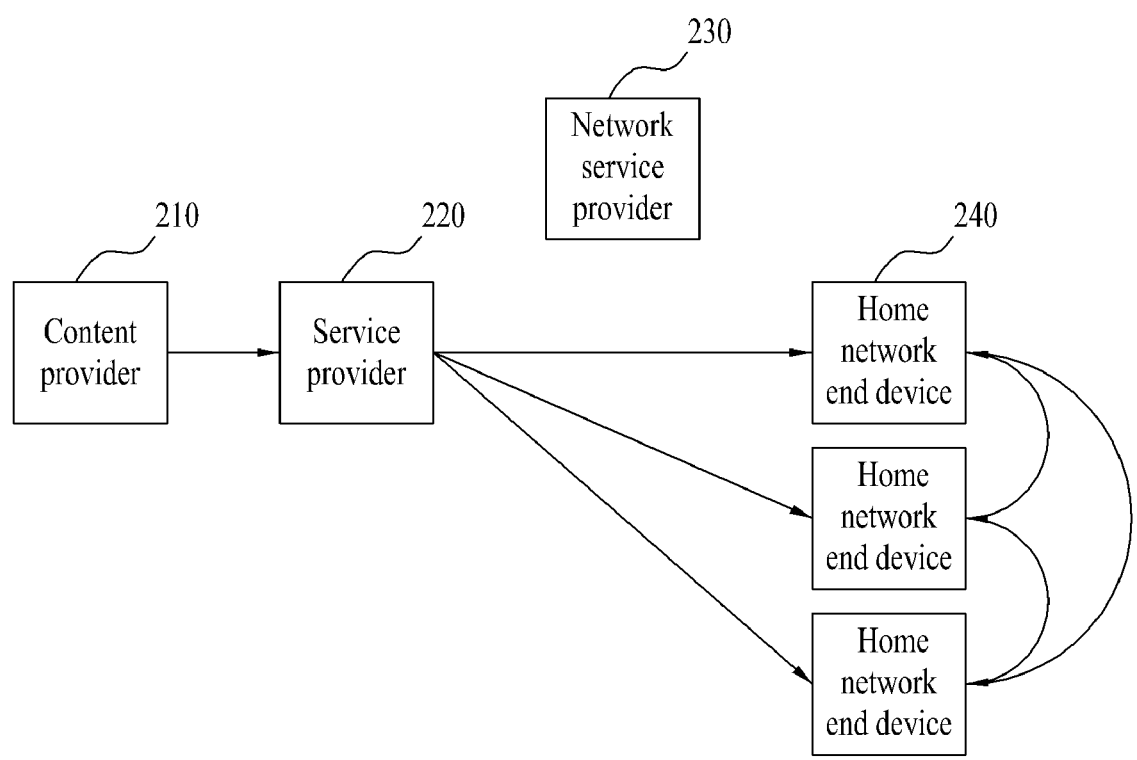
FIG. 2 is a block diagram of an IPTV system over P2P delivery according to an embodiment of the present invention.

FIG. 2 shows an IPTV system over P2P delivery according to an embodiment of the present invention. The IPTV system over P2P delivery according to an embodiment of the present invention will now be explained with reference to FIG. 2.

Referring to FIG. 2, the IPTV system over P2P delivery includes a CP 210, a SP 220, a NSP 230, and HNEDs 240.

Distinguished from FIG. 1, resources of the HNEDs can be shared using P2P delivery, as shown in FIG. 2, and thus the IPTV service can be provided more efficiently. However, since conventional P2P delivery is oriented to file transmission, it is not suitable for streaming transmission. Accordingly, the present invention newly defines a P2P delivery technology suitable for IPTV streaming transmission.

Figure 3:
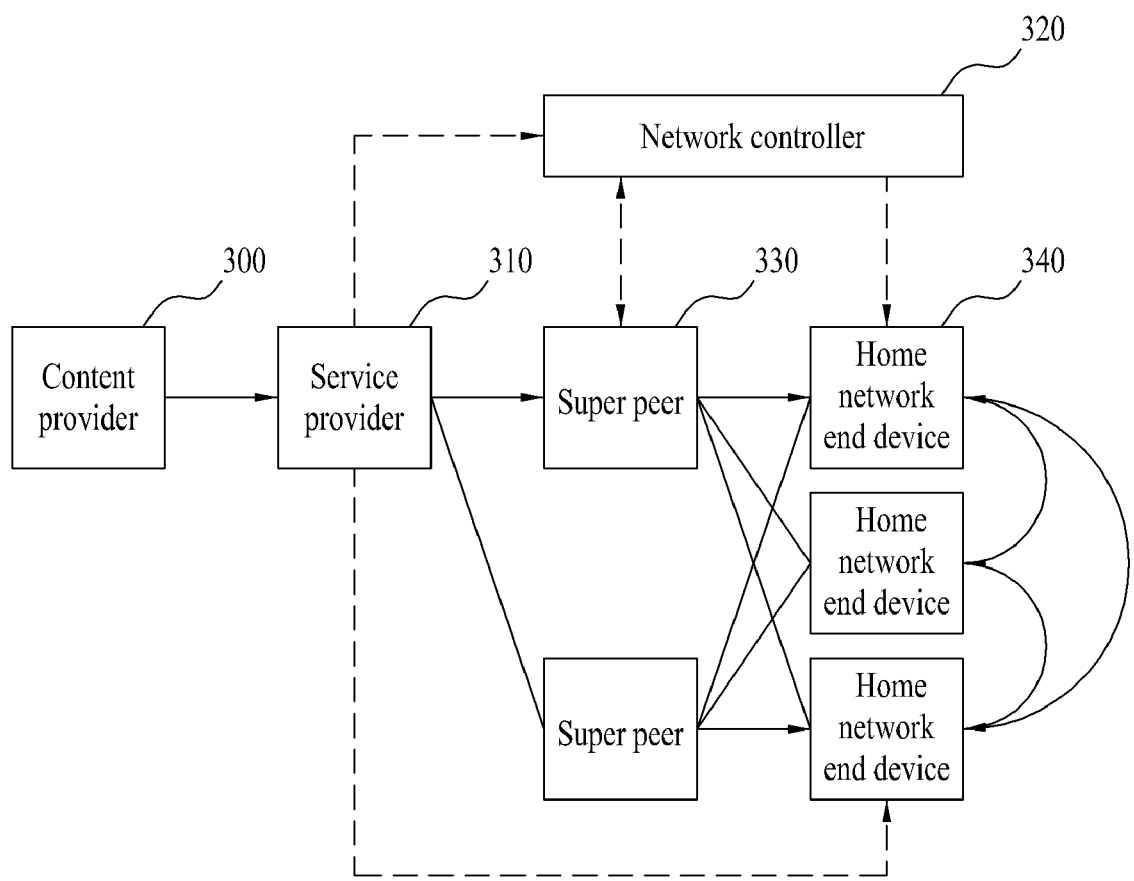
FIG. 3 shows the IPTV system shown in FIG. 2 in more detail.

FIG. 3 shows the IPTV system shown in FIG. 2 in more detail. P2P delivery for IPTV streaming transmission will now be explained with reference to FIG. 3. For reference, a solid line shown in FIG. 3 denotes data flow and a dotted line denotes control signal flow.

A CP (Content Provider) 300 provides contents.

A SP (Service Provider) 310 distributes contents and transmits contents and a content list. In addition, the SP manages a NC and a super peer.

A NC (Network Controller) 320 manages transmission ID of contents transmitted in a network, part ID of the contents, peer ID of a receiver, peer priority, access addresses, etc., and shares this information with a super peer and a HNED.

A super peer 330 is managed by the SP and may have a CDN (Content Delivery Network) function. In this case, the super peer can transmit a large amount of contents to a plurality of receivers.

A HNED (Home Network End Device) 340 corresponds to a normal peer or receiver. The HNED receives an IPTV service list from the SP, selects a specific IPTV service, receives the selected IPTV service, and transmits the received IPTV service to another HNED. The HNED confirms peers and IPTV services which can be received from the peers using the NC and reports the NC of information about the received IPTV service. Accordingly, the NC can manage IPTV service receiving state.

Figure 4:
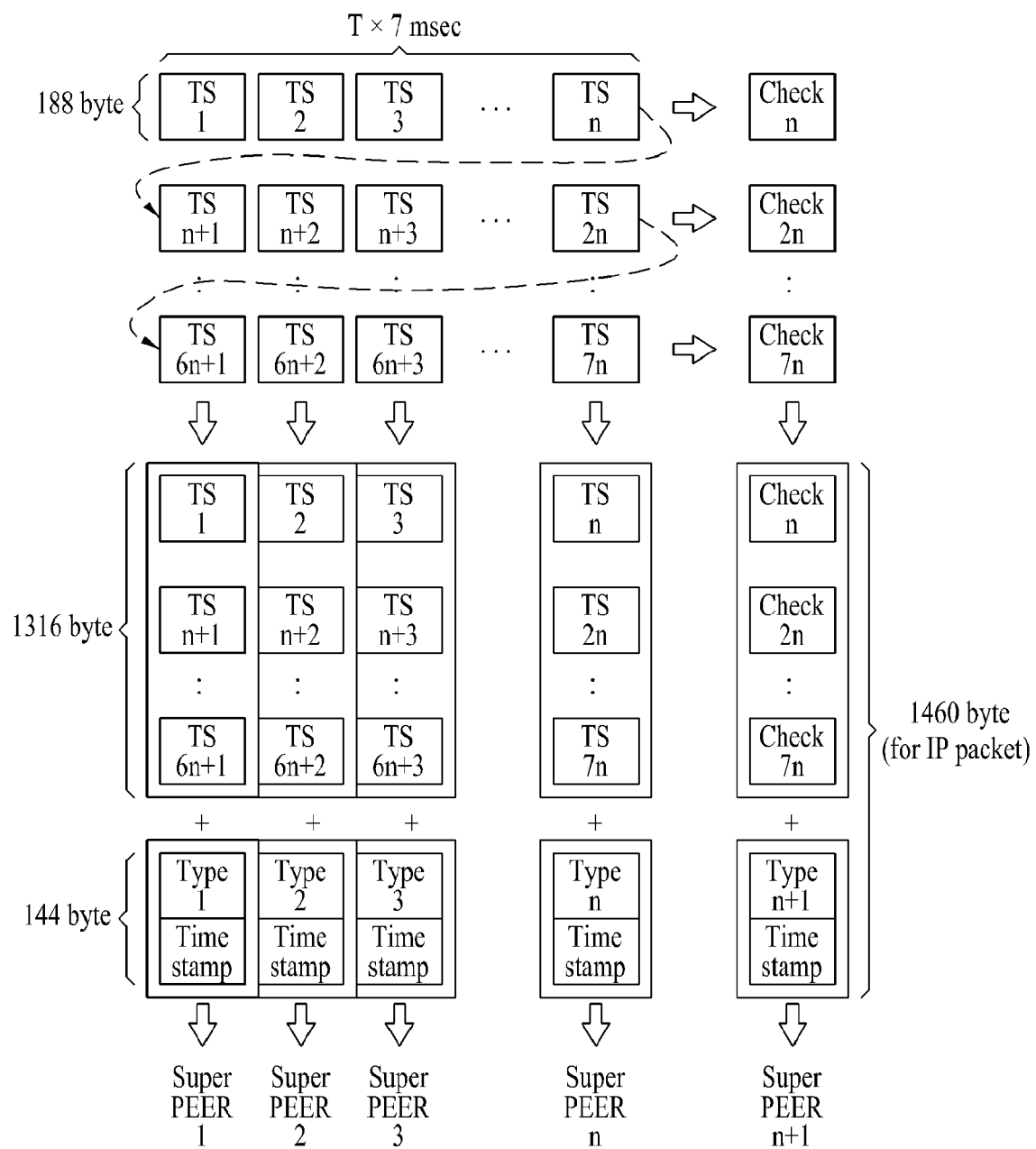
FIG. 4 illustrates a process of generating data for an IPTV streaming service according to an embodiment of the present invention.

FIG. 4 illustrates a process of generating data for an IPTV streaming service according to an embodiment of the present invention. The process of generating data for an IPTV streaming service according to an embodiment of the present invention will now be explained with reference to FIG. 4.

For example, the SP encapsulates TS packets in a form suitable for P2P delivery in order to transmit contents (IPTV service streaming) received from the CP to a super peer through a P2P network. The super peer transmits encapsulation data received from the SP to at least one peer.

The SP arranges the TS packets in n units. For example, n may be a natural number. The SP collects TS packets of n skipped units to generate an encapsulation unit for an IPTV streaming service. The SP adds an extension header containing type information to the generated encapsulation unit. The type information may be information for identifying the sequence of the encapsulation unit, which is required for decoding the IPTV streaming service. In addition, the SP adds an IP header to the encapsulation unit to which the extension header containing the type information is added, in order to generate an IP packet.

This is explained in more detail with reference to FIG. 4.

The SP arranges TS packets in a predetermined streaming unit (T msec). The streaming unit is related to a broadcast transfer rate, and an appropriate number of super peers are required in order to maintain a transfer rate of a specific level. For example, a number (n) of super peers, as described below, are needed.

$$n=(1000000*R/8)/(188*T/1000) \text{ (}R\text{ is a transfer rate (Mbps) and }T\text{ is a streaming rate (msec))}$$

Notably, n+1 super peers are required when a parity/CRC stream for error check is considered.

Furthermore, if an IP packet size is supposed to be 1460 bytes, an encapsulation unit proposed by the present invention includes seven TS packets each having a size of 188 bytes. This is exemplary and can be varied if required. More specifically, the number of TS packets is determined by the following equation.

The number of TS packets included in an IP packet=IP packet size/TS packet size

Accordingly, as described above, if the IP packet size is 1460 bytes and the TS packet size is 188 bytes, the number of TS packets included in an IP packets is approximately 7.766.

Furthermore, the 7n TS packets are arranged in n units to generate an additional stream for a parity or CRC check. In this case, an IPTV receiver can check if received streams have an error.

TS packets are arranged in n skipped units (for example, 1, n+1, 2n+1, . . . , 6n+1) rather than grouped into groups each having sequential seven TS packets, to be transmitted. In this case, if an error is generated in a specific encapsulation unit, the influence of the error can be minimized even if a corresponding TS packet is ignored.

Moreover, an extension header is generated and added to each encapsulation unit. The extension header may be 144 bytes and includes time stamp information and type information required to re-arrange interleaved data as shown in FIG. 4 in an original sequence.

Finally, the SP codes encapsulation units generated in the above-mentioned steps into IP payloads and transmits the IP payloads to a super peer. The super peer transmits an IP packet to at least one peer through a P2P network.

Therefore, an embodiment of the present invention newly defines a basic frame unit for transmitting IPTV service streaming through the P2P network, as shown in FIG. 4. Furthermore, the influence of an error can be minimized by using an interleaved packet structure.

Figure 5:
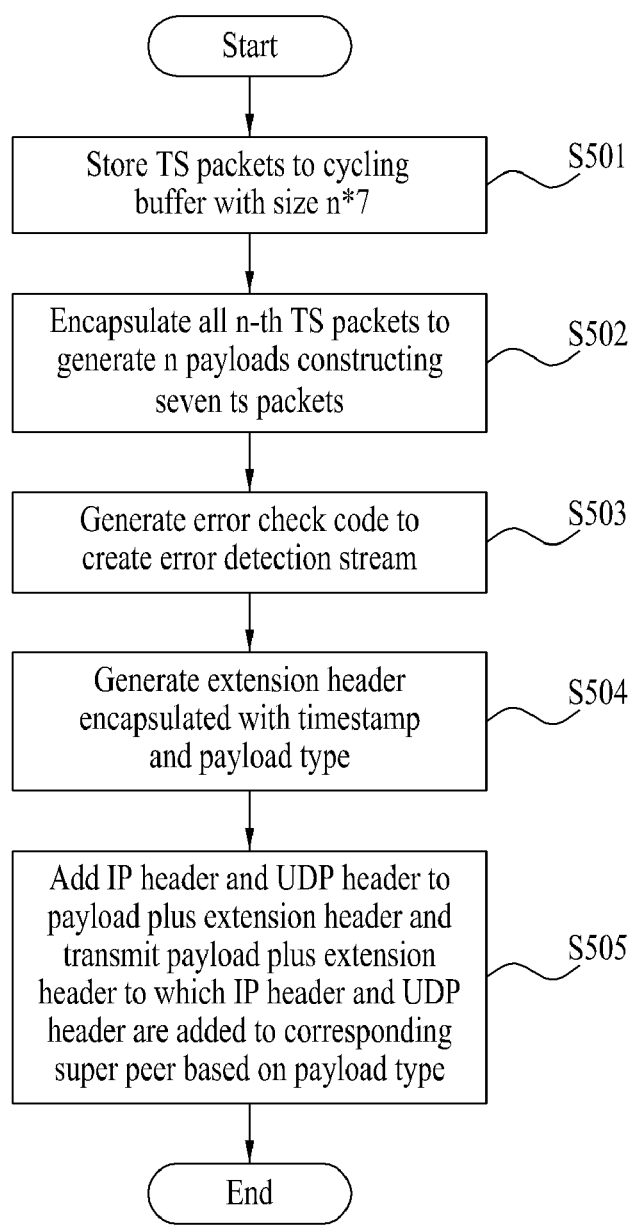
FIG. 5 is a flowchart for subsidiarily explaining the process shown in FIG. 4.

FIG. 5 is a flowchart for subsidiarily explaining the process shown in FIG. 4. The data generating process shown in FIG. 4 will now be explained with reference to FIG. 5.

The SP stores TS packets to a cycling buffer with a size of n*7 (S501). The SP encapsulates all nth TS packets to generate n payloads constructing seven TS packets (S502). The SP generates an error check code to create an error detection stream (S503). The SP generates an extension header encapsulated with timestamp and payload type (S504). The SP adds an IP header and a UDP header to the payload plus extension header, and transmits the payload plus extension header to which the IP header and UDP header are added to a corresponding super peer depending on the payload type (S505).

Figure 6:
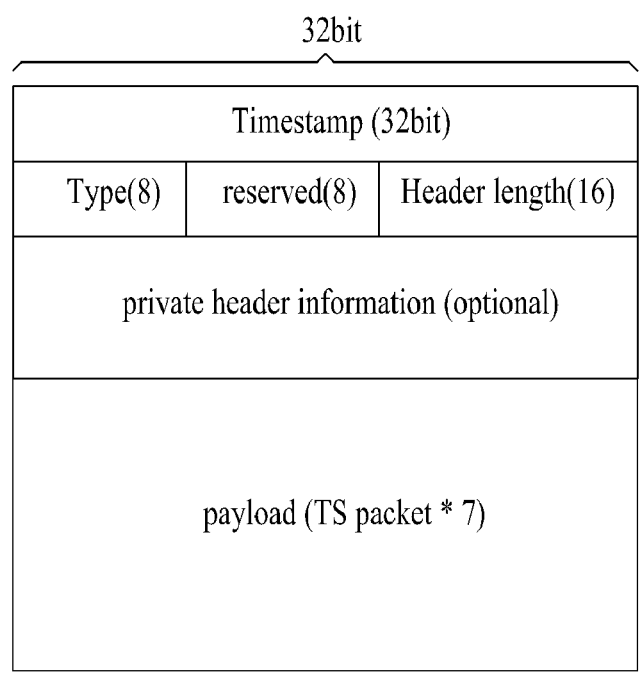
FIG. 6 shows an extension header of data for an IPTV streaming service, which is generated according to an embodiment of the present invention.

FIG. 6 shows an extension header of data for an IPTV streaming service, which is generated according to an embodiment of the present invention. An extension header for P2P delivery encapsulation will now be explained with reference to FIG. 6.

An extension header according to an embodiment of the present invention includes a timestamp that indicates a time when an encapsulation payload is generated, and type information that represents a super peer for which the encapsulation unit corresponding thereto is destine or whether the encapsulation unit is for error detection.

In addition, the extension header may include private information with a length defined by an optional extension header length. A payload follows the private information having a skipped space corresponding to the extension header length between the private information and the payload.

Figure 7:
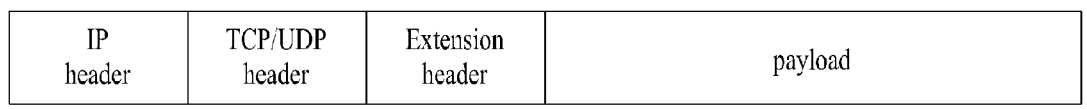
FIG. 7 shows an IP packet of data for an IPTV streaming service, which is generated according to an embodiment of the present invention.

FIG. 7 shows an IP packet of data for an IPTV streaming service, which is generated according to an embodiment of the present invention. The structure of an IP packet transmitted from the SP to a super peer will now be explained with reference to FIG. 7.

An IP packet according to an embodiment of the present invention includes an IP header, a TCP/UDP header, an extension header, and a payload, which are sequentially arranged. Particularly, the extension header and the payload become a basic unit of streaming distributed from a super peer to at least one peer through a P2P network.

A protocol used when the SP transmits data to a super peer is optional.

For example, a UDP protocol is used when rapid transmission is required. Also, a RTP protocol may be used. A TCP protocol may be used when high-reliability transmission is required.

Figure 8:
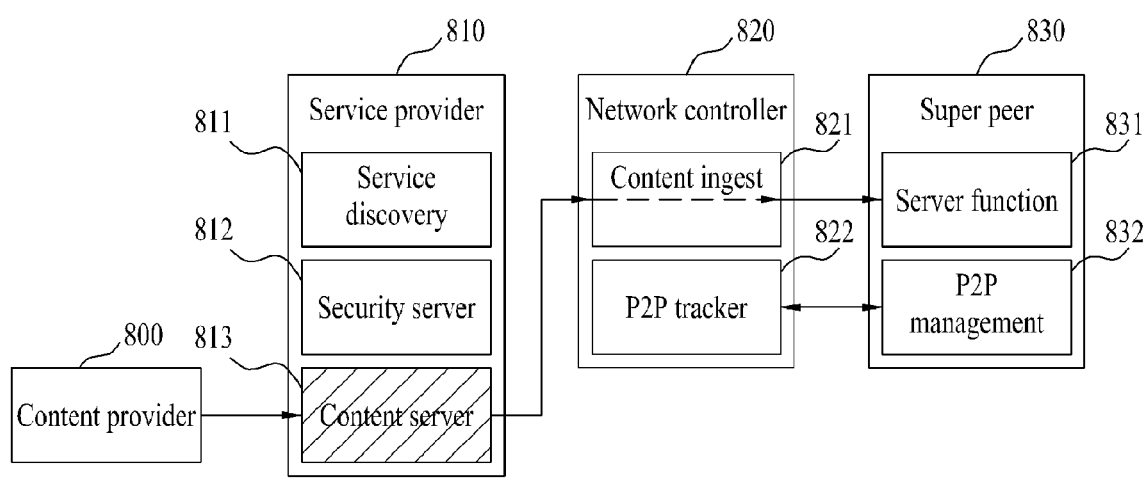
FIG. 8 shows components of an IPTV system according to an embodiment of the present invention.

FIG. 8 shows components of an IPTV system according to an embodiment of the present invention in detail. A CP, SP, NC, and super peer constructing the IPTV system according to an embodiment of the present invention will now be explained with reference to FIG. 8.

A CP 800 provides IPTV service streaming and contents in a TS form.

A SP 810 includes a service discovery 811, a security server 812, and a content server 813, collects contents in the TS form and provides an IPTV service list and an IPTV service to a user.

The service discovery 811 provides a list of contents provided to the user and detailed information.

The security server 812 applies DRM, for example, to contents for IPTV service security.

The content server 813 encodes a TS stream into data suitable for P2P delivery and transmits encoded data to a P2P network.

The NC 820 includes a content ingest 821 and a P2P tracker 822 and manages the network such that the IPTV service can be smoothly delivered to the user.

The content ingest 821 transmits contents to a super peer 830 using a CDN function and delivers encapsulation frame information of the transmitted contents to the P2P tracker 822.

The P2P tracker 822 generates ID (for example, hash code) from an encapsulation frame and transmits information about the super peer and information about contents transmission state to a HNED or the super peer 830.

The super peer 830 includes a server function 831 and a P2P management 832.

The server function 831 receives a content encapsulation frame from the content server 813 and transmits the content encapsulation frame to receivers under the control of the P2P tracker 822.

The P2P management 832 provides information about content possession state, upload state, transfer rate, etc. of the super peer to the P2P tracker 822.

Figure 9:
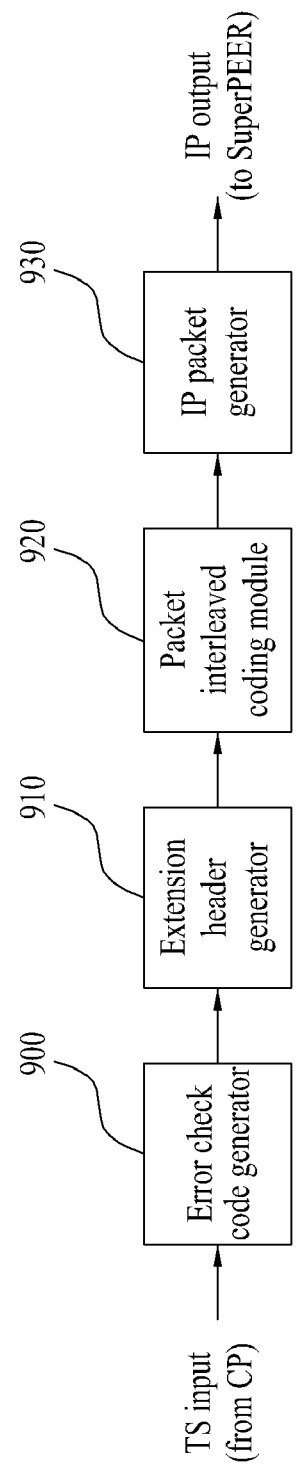
FIG. 9 shows components of a content server shown in FIG. 8.

FIG. 9 shows components of the content server shown in FIG. 8 in detail. Modules constructing the content server of the SP will now be explained with reference to FIG. 9.

The content server includes an error check code generator 900, an extension header generator 910, a packet interleaved coding module 920, and an IP packet generator 930.

Figure 11:
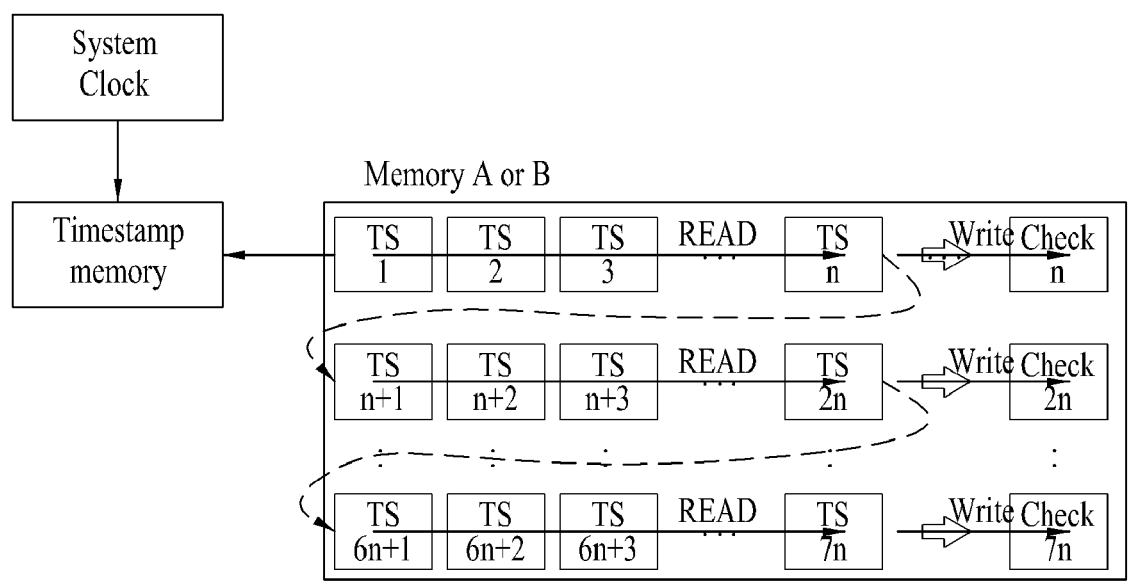
FIG. 11 is a diagram for explaining activity of an error check code generator shown in FIG. 9.

The error check code generator 900 generates error detection codes such as parity, CRC, etc. More specifically, as shown in FIG. 11, one error check code is generated for every n TS packets. Accordingly, a receiver can detect an error using the error check code.

Figure 12:
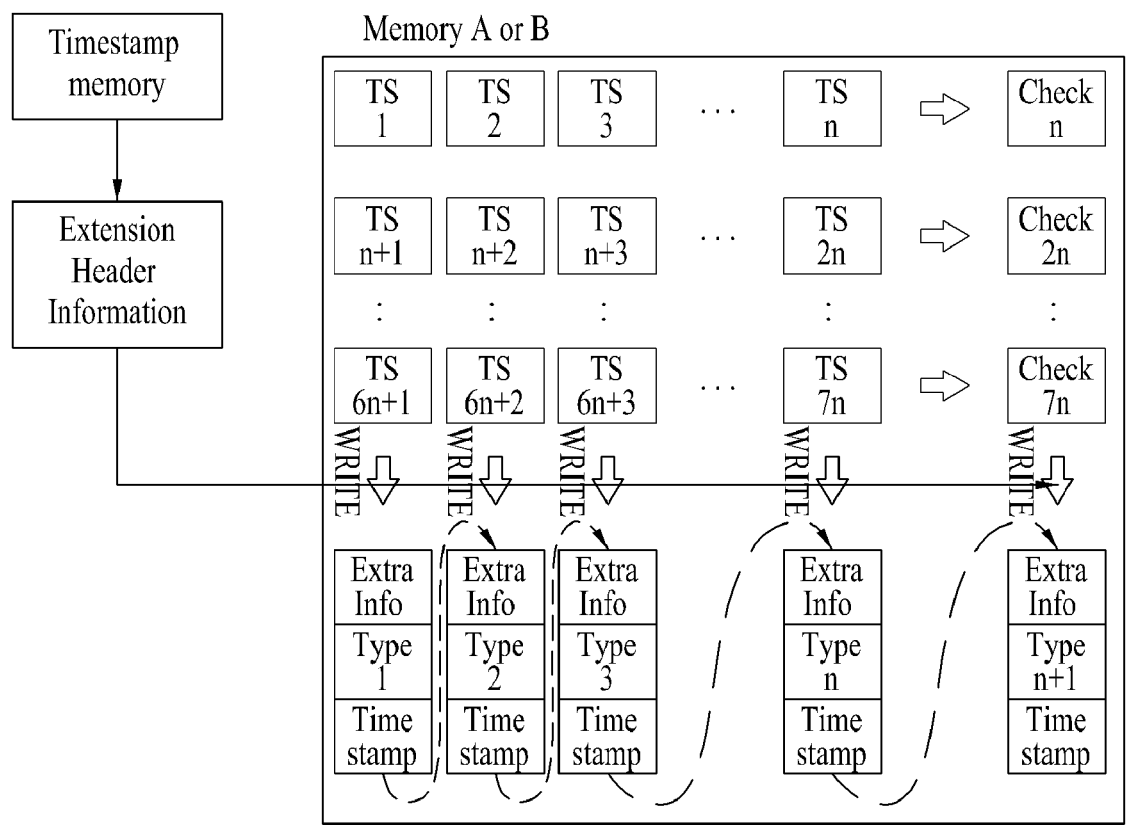
FIG. 12 is a diagram for explaining activity of an extension header generator shown in FIG. 9.

Referring to FIG. 12, the extension header generator 910 generates an extension header on the basis of timestamp generated on the basis of the time of first TS, and type information representing locations of n encapsulation payloads.

Figure 13:
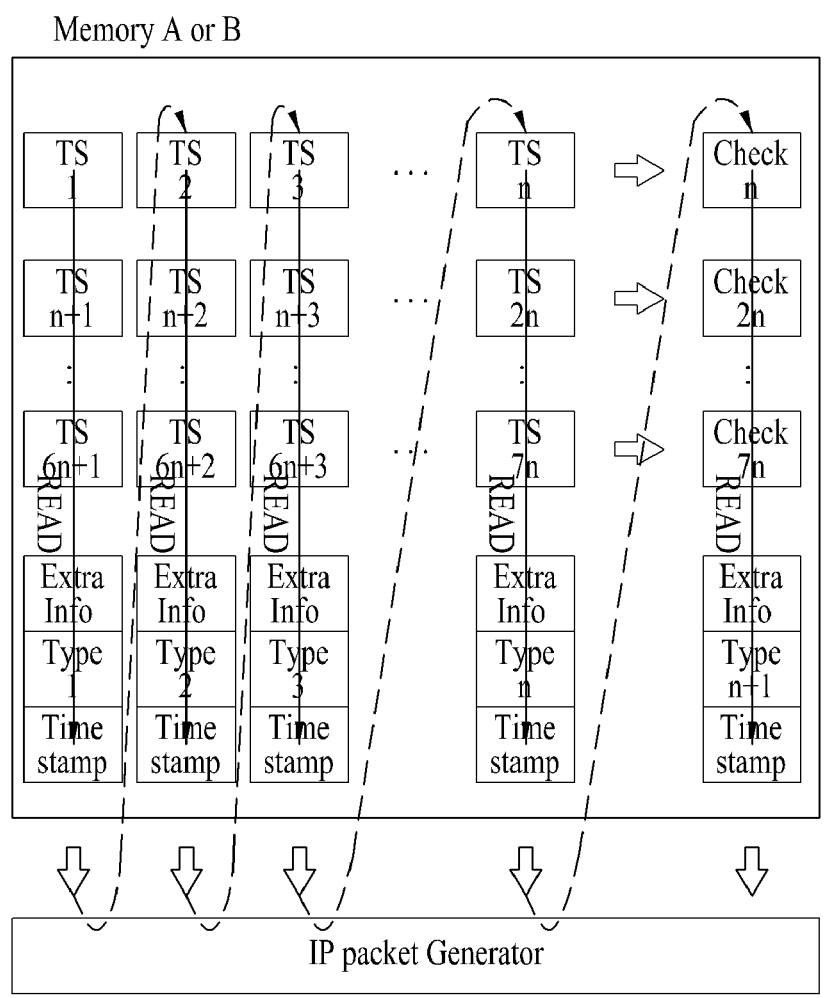
FIG. 13 is a diagram for explaining activity of a packet interleaved coding module shown in FIG. 9.

Referring to FIG. 13, the packet interleaved coding module 920 generates an encapsulation frame composed of seven TS packets of n skipped units from n*7 TS packets.

The IP packet generator 930 adds an IP header and a UDP/TCP header to the generated encapsulation frame to generate an IP packet and transmits the IP packet to a super peer.

Figure 10:
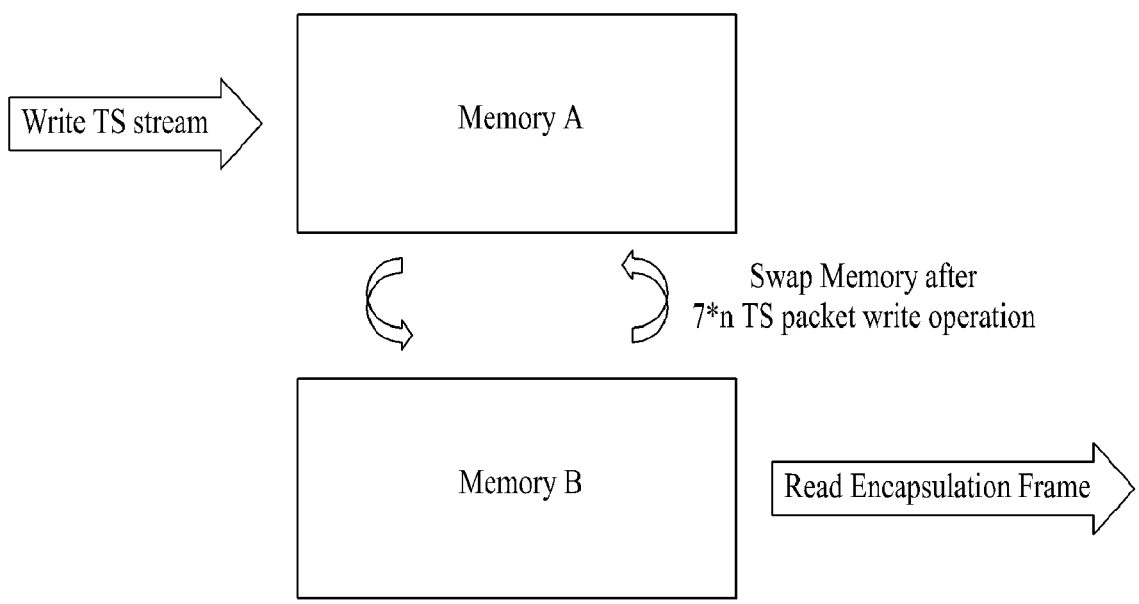
FIG. 10 shows a memory for supporting the content server shown in FIG. 8.

FIG. 10 shows a memory for supporting the content server shown in FIG. 8. A memory for supporting the operation of the content server shown in FIG. 8 will now be explained with reference to FIG. 10.

As shown in FIG. 10, if 7*n TS packets are written on a memory A, the next 7*n TS packets are written on a memory B. While the next 7*n TS packets are being written on the memory B, the memory A adds an extension header to the stored 7*n TS packets, encodes the TS packets to generate an encapsulation frame, reads the generated encapsulation frame, and then transmits the encapsulation frame to an IP network. While the memory B performs this operation, the memory A writes 7*n TS packets following the next 7*n TS packets.

Figure 14:
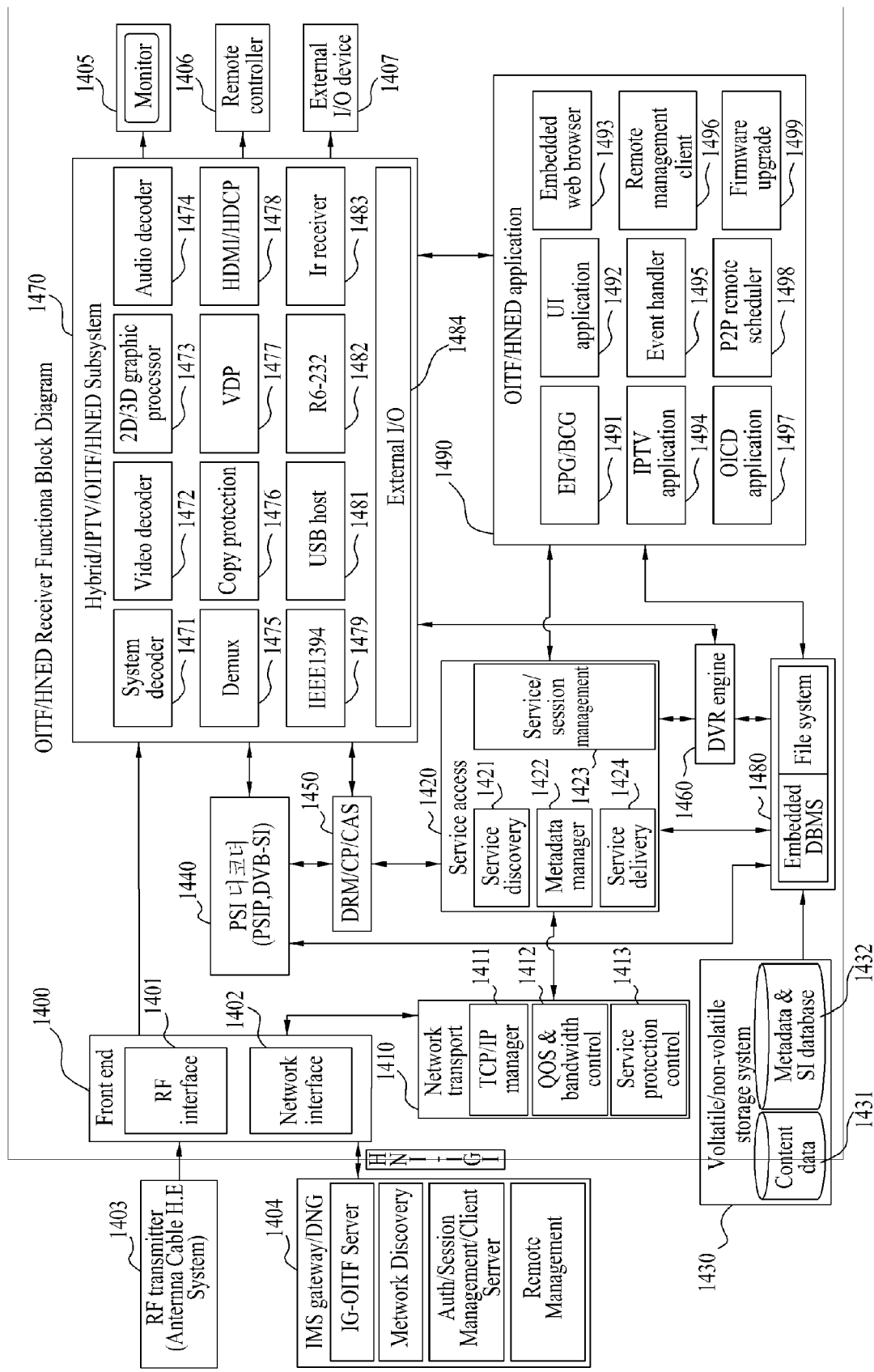
FIG. 14 shows modules in the IPTV system according to an embodiment of the present invention in detail.

FIG. 14 shows modules in an IPTV system according to an embodiment of the present invention. The modules in the IPTV system according to an embodiment of the present invention will now be explained with reference to FIG. 14.

A front-end 1400 includes an RF interface 1401 and a network interface 1402. The RF interface 1401 receives a radio frequency and digitalizes the radio frequency to decode MPEG-2 TS. The network interface 1402 receives and transmits Internet protocol packets. The network interface 1402 operates as a physical data link.

A network transport 1410 includes a TCP/IP manager 1411, a QoS & bandwidth controller 1412, and a service protection control 1413. The TCP/IP manager 1411 manages IP packet transmission and distributes packets to appropriate protocol managers.

The QoS & bandwidth control 1412 secures IPTV service quality. The QoS & bandwidth control 1412 balances a bandwidth for each service and is controlled by the service provider or user. Bandwidths are managed by an IPTV application or the service provider. The QoS & bandwidth control 1412 rejects unallowable accesses from other peers or other systems.

The service protection control 1413 performs a security function and protects all logical/physical links to the service provider or other clients.

A service access 1420 includes a service discovery 1421, a metadata manager 1422, a service and session control management 1423, and a service delivery 1424.

The service discovery 1421 enables transmission of IPTV service through a two-way IP network. The service discovery 1421 provides all information that selects the service, and manages P2P provider information and P2P tracker access information. In addition, IGMP, DHCP, and SIP protocol stack are provided.

The metadata manager 1422 parses an XML document, manages the XML document and stores the XML document in a file system. The service and session control management 1423 selects and manages a service and administrates sessions such as live broadcast service and VoD service using IGMP or RTSP protocol.

If IMS is used, SIP protocol is used to initialize and manage sessions through an IMS gateway. The RTSP protocol may be used to control broadcast TV transmission as well as on-demand transmission. The RTSP protocol uses TCP connection and permits trick mode control for real-time media streaming.

The service delivery 1424 handles real-time streaming data and content download. The service delivery 1424 can restore contents from a content DB for further consumption.

The service delivery 1424 searches for user request contents and transmits the user request contents. RTP/RTCP/RTSP (Real-Time Transport Protocol/RTP Control Protocol/Real-Time Streaming Protocol) is used with MPEG-2 TS.

MPEG-2 packet is encapsulated with RTP. The service delivery 1424 parses an RTP packet and transmits a parsed TS packet to a demultiplxer. The service delivery 1424 transmits feedback about network receiving capability using RTCP.

A user can control an IP streaming protocol that supports trick play for VOD or live media broadcast.

MPEG-2 transport packet may be directly conveyed to UDP without RTP for content download, and HTTP or FLUTE protocol is used.

A volatile/Non-volatile storage system includes a content DB 1431 and a metadata & SI DB 1432. The content DB 1431 is a database for contents recorded from live media TV or transmitted by a content download system. The metadata & SI DB 1432 is a database for service discovery information and metadata related to a service.

A program system information decoder 1440 sets a PSI table and PID for PSIP/DVB-SI. The program system information decoder 1440 decodes private sections of PSI sent by the demultiplexer. A decoding result is used to demultiplex a transport packet.

A DRM/CP/CAS 1450 requests the metadata manager to store content license and a key value from a license issuer. The DRM/CP/CAS 1450 controls a descrambler block to decode encrypted contents. In addition, the DRM/CP/CAS 1450 manages live media streams protected by content protection technology and downloaded contents.

OITF manages the life cycle of live media streaming or downloaded contents. A bypass mode which is passed from an MPEG decoder is supported.

A DVR engine 1460 plays and stores live streaming contents. The DVR engine 1460 generates additional information for better environment or collects metadata of recorded contents. An embedded DBMS/file system 1480 manages electronic program schedule data, MXL data, and manageable data.

A hybrid/OITF/HNED subsystem 1470 includes a system decoder 1471, a video decoder 1472, a 2D/3D graphic processor 1473, an audio decoder 1474, a demultiplexer 1475, a copy protection 1476, a video display processor 1477, a HDMI/HDCP 1478, IEEE1394 1479, a USB host 1481, RS-232 1482, an IR receiver 1483, and an external I/O 1484.

The system decoder 1471 decodes MPEG-2 TS packets. The system decoder 1471 copies elementary packets and stores the copied elementary packets in a predetermined memory region.

The demultiplexer 1475 demultiplexes audio, video, PSI table from an input transport packet. The demultiplexer 1475 controls demultiplexing of PSI tables according to the PSI decoder. The demultiplexer 1475 creates sections of a PSI table and transmits the sections to the PSI decoder. The demultiplexer 1475 controls demultiplexing of A/V TS.

The IEEE 1394 1479 supports IEEE1394 interface. The video decoder 1472 decodes a video elementary stream packet.

The audio decoder 1474 decodes an audio elementary stream packet. The copy protection 1476 supports AES, DES and other scrambling/descrambling algorithms. Encrypt and decrypt key values may be provided by other modules.

The USB host 1481 supports a USB interface. The 2D/3D graphic processor 1473 manages several planes to administrate caption and UI application. The USB host 1481 manages OSD (On Screen Display) and 2D graphic data. The USB host 1481 renders 3D data on a graphic display plane.

The video display processor 1477 processes a video filter in a user selection region or the overall screen. The video display processor 1477 accesses a video frame buffer memory to manage video or still images.

The RS-232 1482 manages an RS-232 interface. The HDM/HDCP 1478 supports HDMI output and supports a HDCP content protection function. The external I/O 1484 manages input/output flow, blocks streams, and filters packets from other entities or internal blocks.

The IR receiver 1483 receives an IR signal from a remote controller. The IR receiver 1483 demodulates the IR signal and analyzes a pressed remote key value. The IR receiver 1483 forwards an appropriate message to UI application or drops it if there is no corresponding remote code.

An OITF/HNED application 1490 includes an EPG/BCG 1491, a UI application 1492, an embedded web browser 1493, an IPTV application 1494, an event handler 1495, a remote management client 1496, an OICD application 1497, a P2P remote scheduler 1498, and a firmware upgrade 1499.

The EPG/BCG 1491 displays electronic program guide (EPG) and broadcast content guide (BCG) on a screen. The EPG/BCG 1491 collects XML data and content information from the metadata manager or embedded database.

The UI application 1492 supports a graphic user interface and receives a user key value from the remote controller. The UI application 1492 manages the overall TV system state.

The OICD application 1497 transmits P2P downloadable contents through the Internet. The remote management client 1496 permits the user to control local application or system.

The P2P remote scheduler 1498 controls the user to access the OITF to search contents and start to download contents that the user wants.

The firmware upgrade 1499 discovers the latest firmware software and notifies the user of the latest firmware software. When the user accepts the notification, the firmware upgrade 1499 updates firmware. The IPTV application 1494 processes data related to the IPTV service.

The event handler 1495 manages a message or event from the service provider. The event handler 1495 determines a place to which the event needs to be transferred. The embedded web browser 1493 renders open Internet contents on the screen.

An RF transmitter 1403 modulates a digitalized broadcast live stream to generate an RF signal. An IMS gateway/DNG 1404 supports connection of an unmanaged network as well as managed network. A gateway allocates an IP address to an OITF/HNED system such that the OITF/HNED system is connected to the service provider or content provider.

Furthermore, a monitor 1405 outputs video data, and a remote controller 1406 forwards a user command signal to the hybrid/IPTV/OITF/HNED subsystem 1470. An external I/O device communicates with the external I/O 1484.

Figure 15:
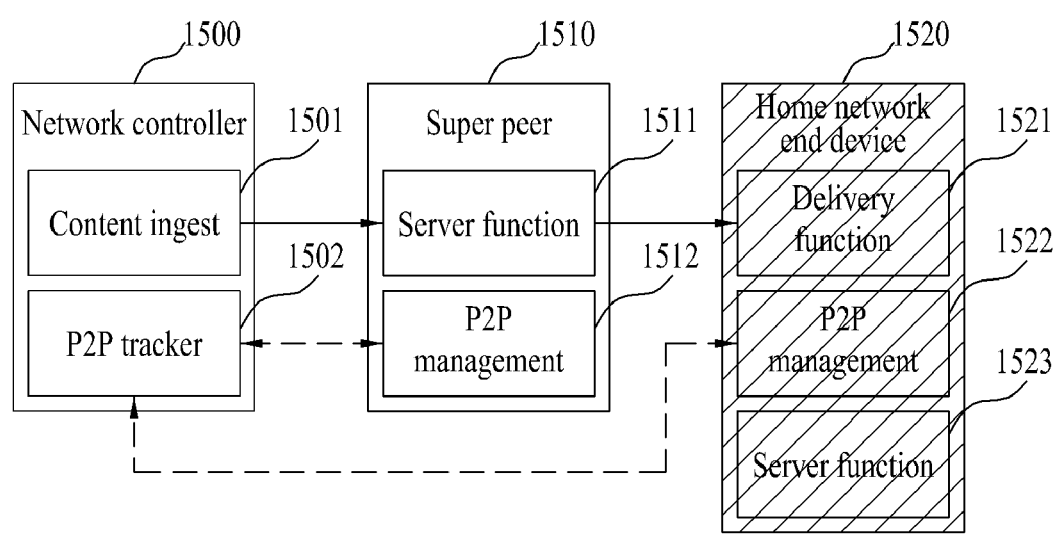
FIG. 15 shows components of a HNED shown in FIG. 3 in detail.

FIG. 15 shows components of the HNED shown in FIG. 3 in detail. The components of the HNED shown in FIG. 3 will now be explained with reference to FIG. 15.

A NC 1500 includes a content ingest 1501 and a P2P tracker 1502, enables smooth transfer of the IPTV service to the user, and manages the network.

The content ingest 1501 transmits contents to a super peer 1510 using a CDN function and delivers encapsulation frame information of the transmitted contents to the P2P tracker 1502.

The P2P tracker 1502 generates an ID (for example, hash code) from an encapsulation frame, and transmits information about the super peer and information about content transmission state to a HNED 1520 or the super peer 1510.

The super peer 1510 includes a server function 1511 and a P2P management 1512.

The server function 1511 receives a content encapsulation frame from the content server and transmits the content encapsulation frame to receivers under the control of the P2P tracker 1502.

The P2P management 1512 provides information such as content possession state, upload state, and transfer rate of the super peer to the P2P tracker 1502.

The HNED 1520 includes a delivery function 1521, a P2P management 1522, and a server function 1523.

The delivery function 1521 receives contents from at least one super peer or another HNED under the control of the P2P tracker 1502. The P2P management 1522 provides information such as shared contents possession state, upload state and transfer rate of the HNED to the P2P tracker 1502. The server function 1523 transmits a content encapsulation frame possessed by the HNED 1520 to other receivers under the control of the P2P tracker 1502.

Figure 16:
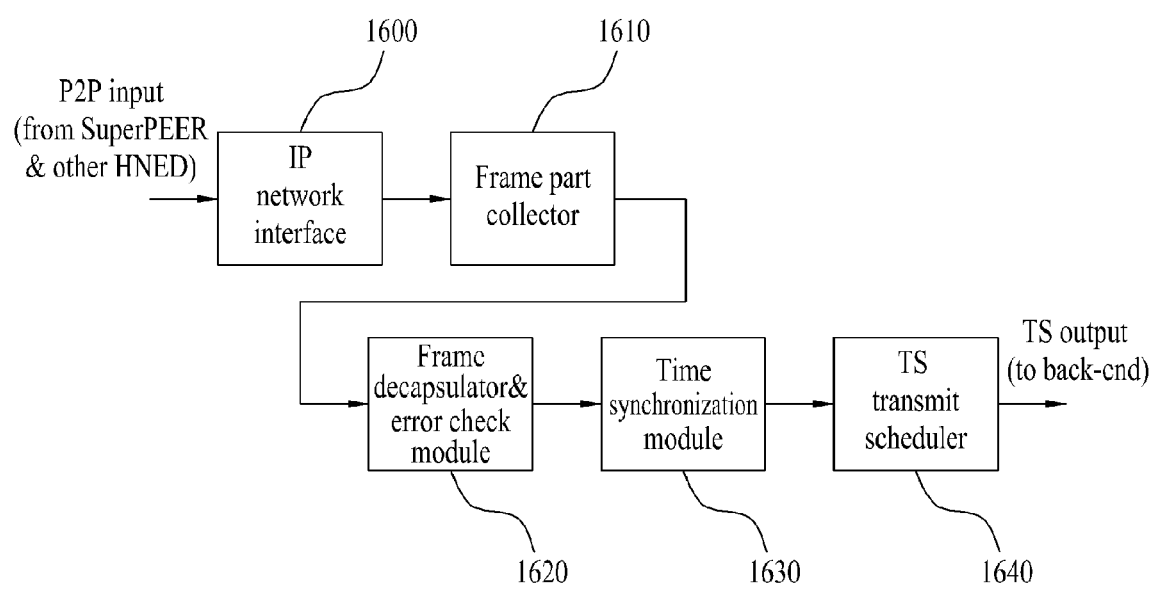
FIG. 16 shows components of a delivery function shown in FIG. 15 in detail.

FIG. 16 shows components of the delivery function shown in FIG. 15 in detail. The delivery function of the HNED will now be explained in detail with reference to FIG. 16. Functions of modules shown in FIG. 16 may be executed by the front-end 1400 shown in FIG. 14.

An IP network interface 1600 receives an IP packet from a super peer. A frame part collector 1610 collects P2P streaming encapsulation frames divided for P2P transmission to reconfigure one frame block. That is, encapsulation units (frames) are rearranged in the original sequence using timestamp and type information of the above-described extension header.

A frame decapsulator & error check module 1620 decapsulates the frames rearranged in the original sequence and checks error using received parity/CRC. A time synchronization module 1630 selects a frame block corresponding to timestamp that needs to be decoded on the basis of STC (System Time Clock). A TS transmit scheduler 1640 sequentially transmits TS of the frame block to a system decoder or a TS decoder.

Figure 17:
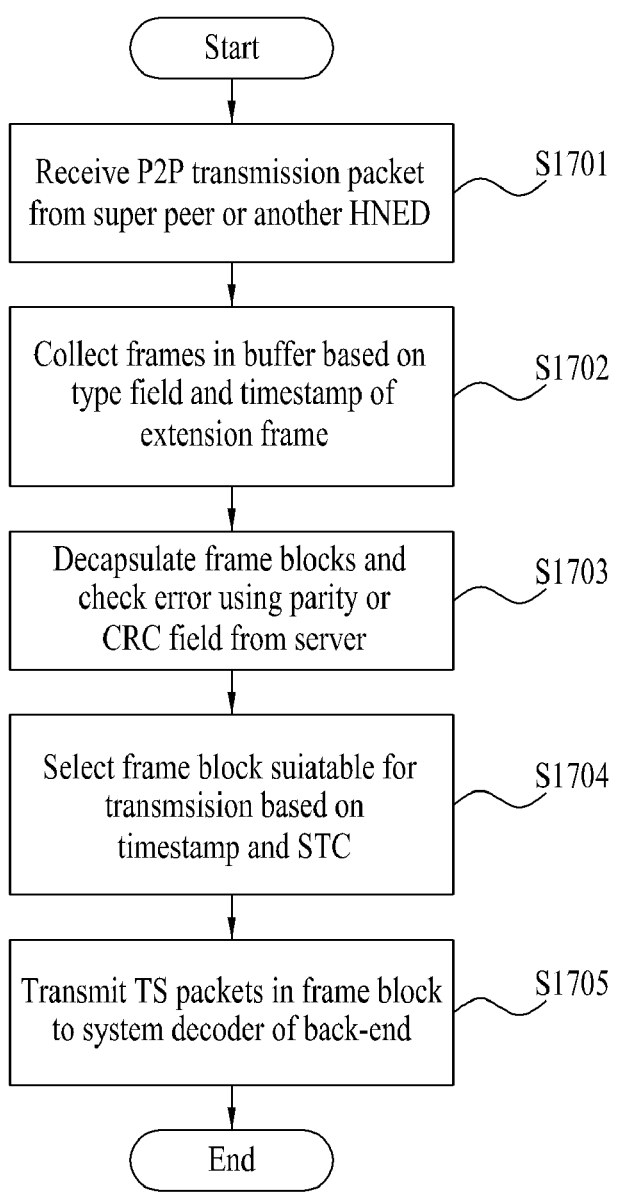
FIG. 17 is a flowchart illustrating a process in which the IPTV system according to an embodiment of the present invention processes an IPTV streaming service by P2P transmission.

The above-mentioned steps will be easily understood with reference to the flowchart shown in FIG. 17.

FIG. 17 is a flowchart illustrating a process in which the IPTV system according to an embodiment of the present invention processes an IPTV streaming service by P2P transmission. The process in which the IPTV system according to an embodiment of the present invention processes an IPTV streaming service by P2P transmission will now be explained with reference to FIG. 17.

A HNED (for example, peer, IPTV) receives a P2P transmission packet from a super peer or another HNED (S1701). The HNED collects frames in a buffer depending on a type field and timestamp of an extension frame (S1702). The HNED decapsulates frame blocks and performs error check using a parity or CRC field from a server (S1703). The HNED selects a suitable frame block to be transmitted depending on the timestamp and STC (S1704). The HNED transmits TS packets in the frame block to the system decoder of the back-end (S1705).

Figure 18:
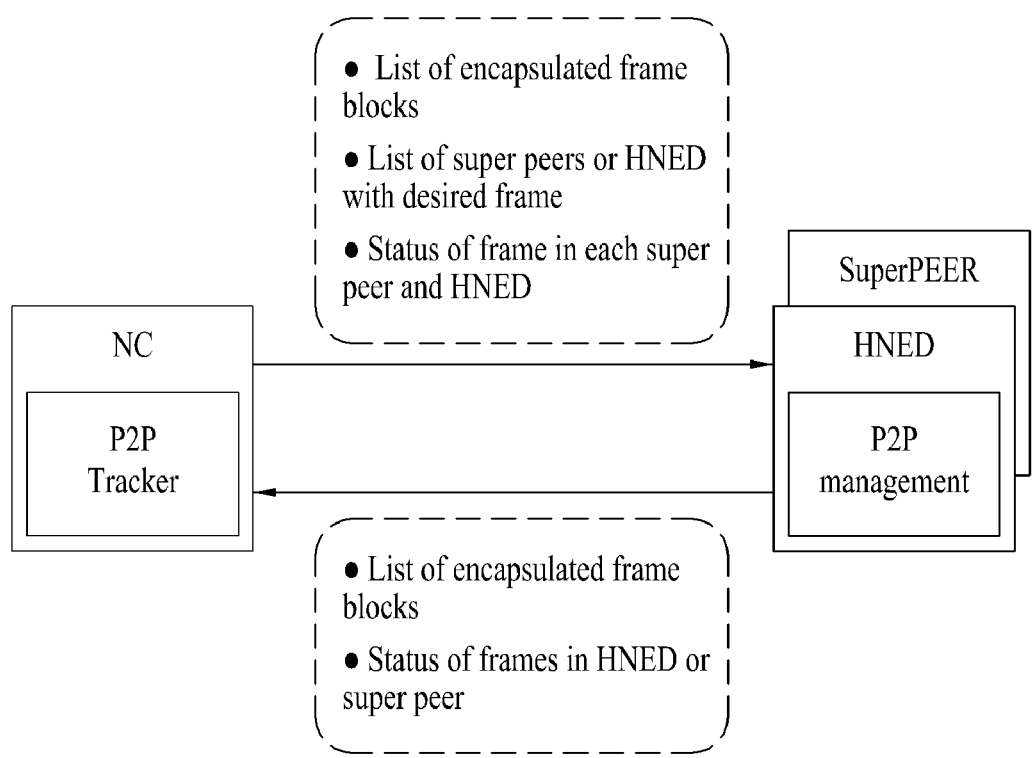
FIG. 18 shows control information transmitted and received between a NC and a HNED of the IPTV system according to an embodiment of the present invention.

FIG. 18 shows control information transmitted and received between the NC and HNED of the IPTV system according to an embodiment of the present invention. The control information transmitted and received between the NC and the HNED of the IPTV system according to an embodiment of the present invention will now be explained with reference to FIG. 18.

As shown in FIG. 18, the NC transmits a frame block list, a list that identifies super peers or HNEDs which transmit frame blocks, and information about frame blocks possessed by the upper peers or HNEDs to a HNED/Super peer.

As shown in FIG. 18, the HNED/Super peer transmits information about frame blocks possessed or transmitted by the HNED/Super peer to the NC.

Accordingly, even if connection of a specific HNED/Super peer is disconnected while a HNED is receiving one frame block, the HNED can be immediately connected with the corresponding HNED/Super peer since the HNED already received the list of other HNEDs/super peers capable of possessing/transmitting the frame block, and receive the frame block. This is explained in more detail with reference to FIG. 19.

Figure 19:
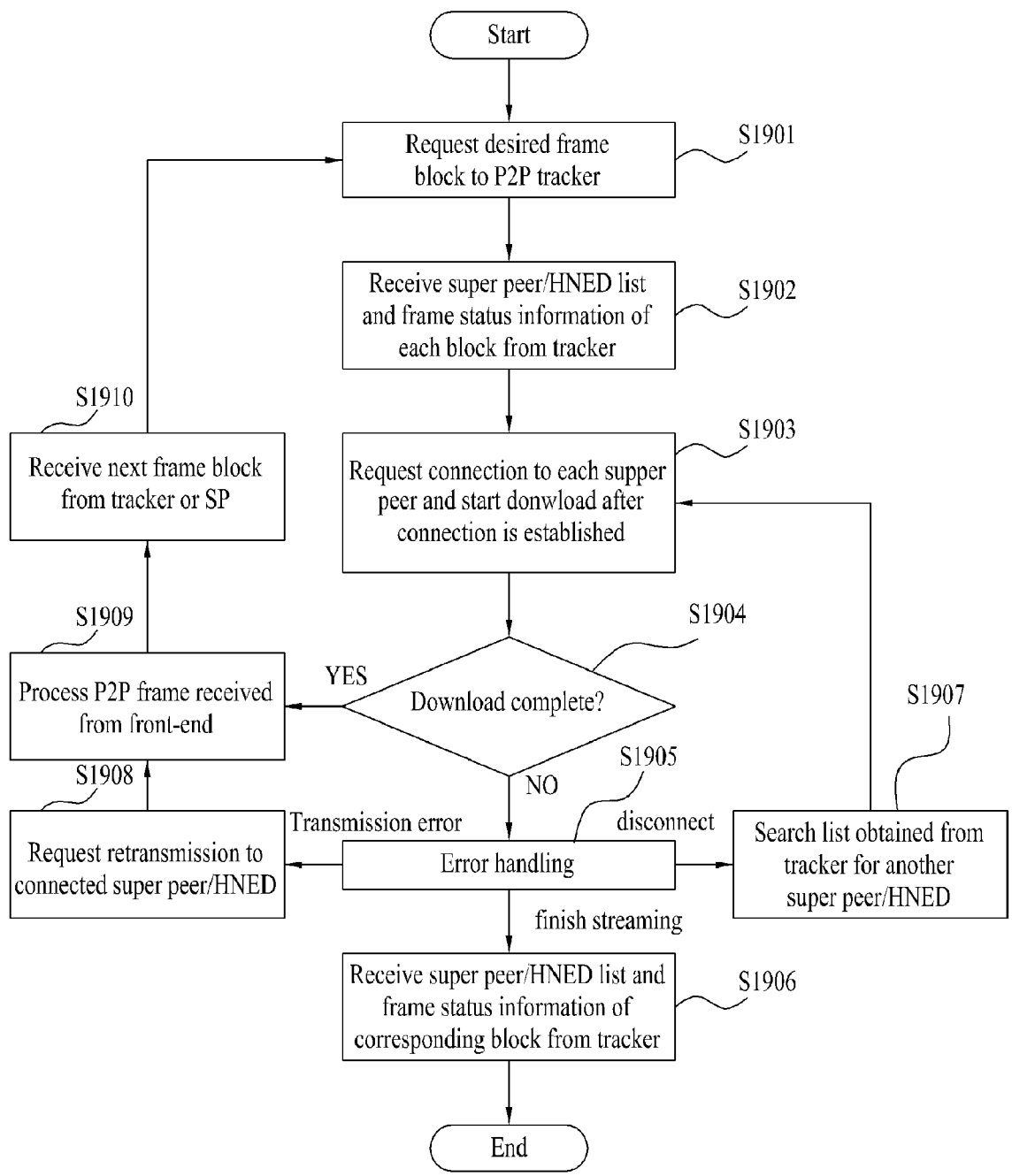
FIG. 19 is a flowchart illustrating a process of automatically searching new connection when disconnection occurs while the IPTV system according to an embodiment of the present invention is receiving an IPTV streaming service by P2P transmission.

FIG. 19 is a flowchart illustrating a process of automatically searching for new connection when disconnection occurs while the IPTV system according to an embodiment of the present invention is receiving an IPTV streaming service by P2P transmission. The process of automatically searching for new connection when disconnection occurs while the IPTV system according to an embodiment of the present invention is receiving an IPTV streaming service by P2P transmission will now be explained with reference to FIG. 19.

A HNED (for example, peer, IPTV) requests the P2P tracker to provide a desired frame block (S1901). The HNED receives a super peer/HNED list and frame state information of each block from the P2P tracker (S1902). The HNED requests each super peer to be connected thereto, and starts download if connection is established (S1903).

The HNED determines whether or not the download is completed (S1904). The HNED performs error handling (S1905). The HNED receives the super peer/HNED list and frame state information of the block from the P2P tracker (S1906). The HNED searches the list received from the tracker for another super peer/HNED (S1907).

The HNED requests re-transmission to the connected super peer/HNED (S1908). The HNED processes a P2P frame received from the front-end (S1909). The HNED receives next frame block information from the tracker or the SP (S1910).

The P2P delivery method supporting streaming in the IPTV system and the data generating method for the same according to an embodiment of the present invention have been explained with reference to FIGS. 1 to 19.

A method for improving transmission efficiency, compared to the above-described embodiment, by adding a NPD (Null Packet Deletion) method according to another embodiment of the present invention will now be explained with reference to FIGS. 20 to 28.

Figure 20:
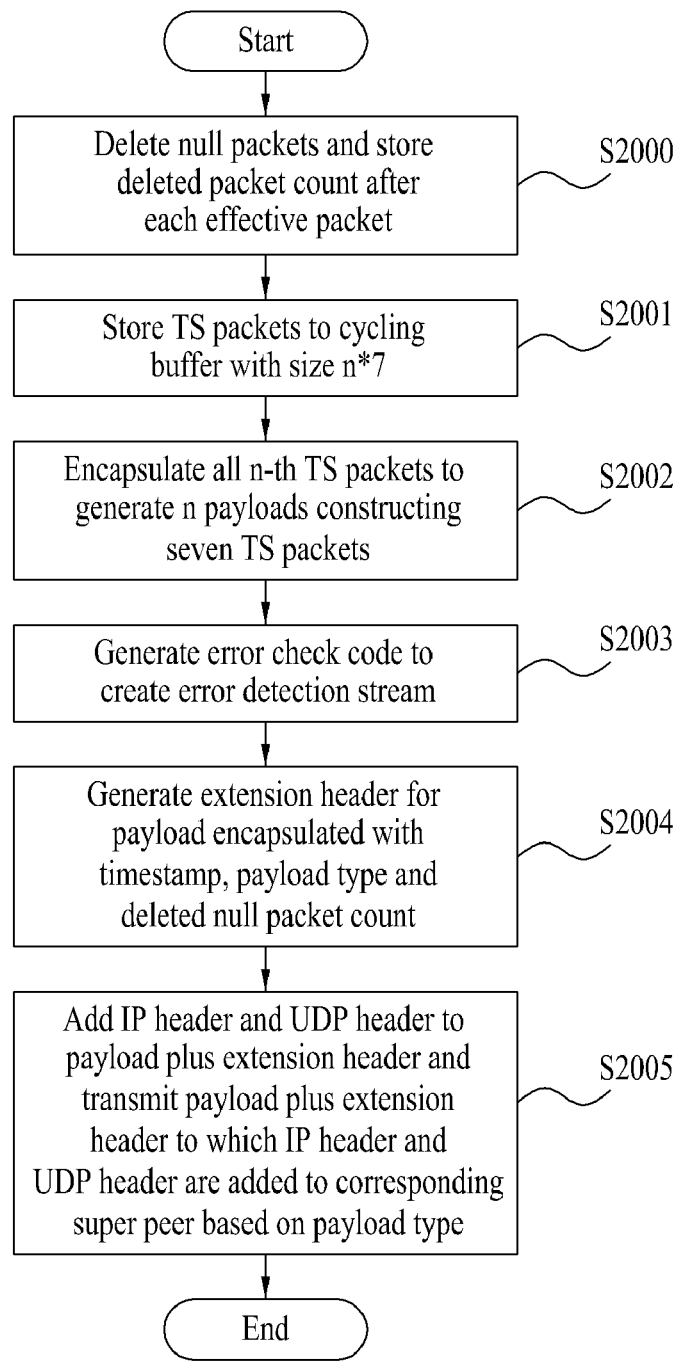
FIG. 20 is a flowchart of a case in which a NPD method is used according to another embodiment of the present invention.

FIG. 20 is a flowchart illustrating a P2P delivery and data generating method including the NPD method according to another embodiment of the present invention. As compared to FIG. 5, step S2000 is added.

The SP deletes null packets and stores a deleted packet count after each effective packet (S2000). The SP stores TS packets to the cycling buffer with a size of n*7 (S2001). The SP encapsulates all nth TS packets to create n payloads constructing seven TS packets (S2002).

The SP generates an error check code to create an error detection stream (S2003). The SP generates an extension header for the encapsulated payloads with timestamp, a payload type, the deleted null packet count (S2004). The SP adds an IP header and a UDP header to the payload plus extension header and transmits the payload plus extension header to which the IP header and the UDP header are added to a corresponding super peer depending on the payload type (S2005).

Figure 21:
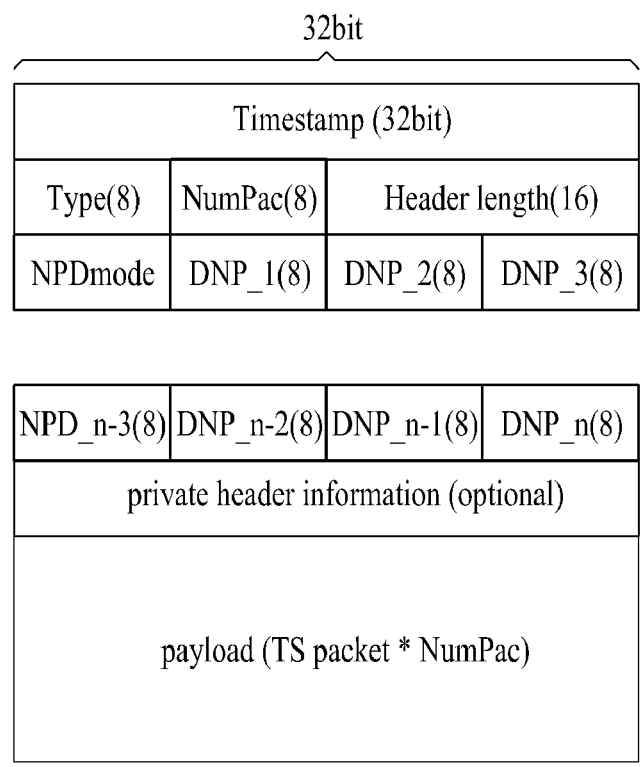
FIG. 21 shows an extension header of data for an IPTV streaming service when the NPD method is used according to another embodiment of the present invention.

FIG. 21 shows an extension header of data for an IPTV streaming service when the NPD method is used according to another embodiment of the present invention. As compared to FIG. 6, NumPac field, NPDmode field and DNP_x field are added.

NumPac field (8 bit) indicates the number of packets in payload area. That is, NumPac field indicates the number of TS packets included in a payload area and transmitted. The number (n) of following DNP fields is determined by the value of NumPac field. For example, n may be 7.

NPDmode field (8 bit) represents whether or not the NPD (Null Packet Deletion) method is used. For example, if NPDmode field is 1, the NPD method is used and n DNP fields follow the NPDmode field. On the contrary, if NPDmode field is 0, it means that the NPD method is not applied.

DNP_x field (8 bit) represents the number of null packets following an effective packet in a payload. For example, the number of null packets exceeds 255, null packets may be inserted as effective packets in the payload area.

Figure 22:
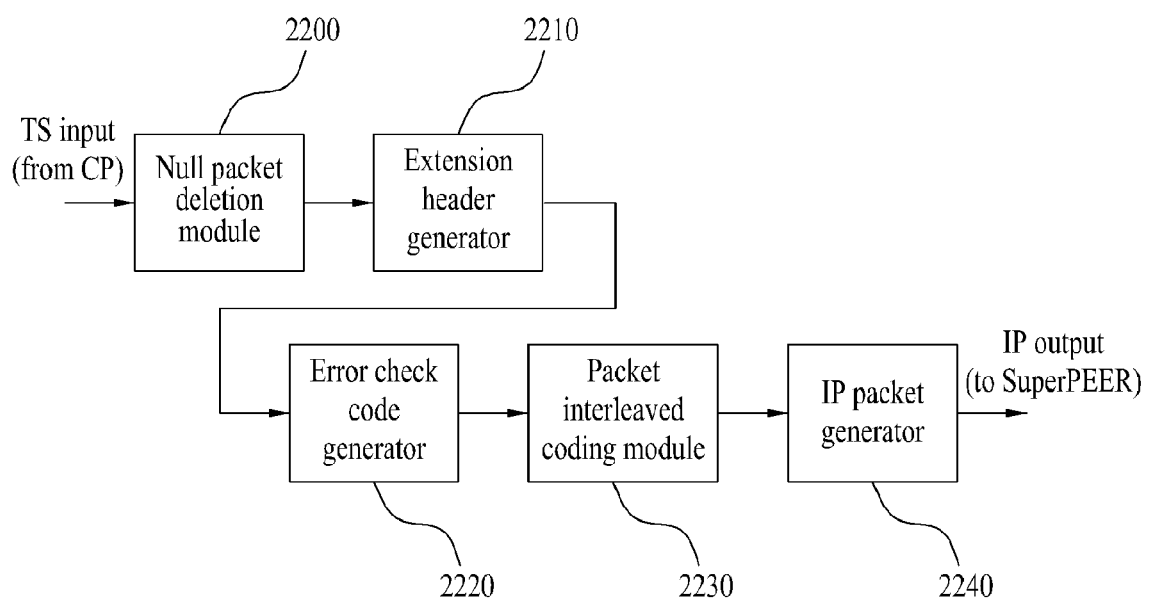
FIG. 22 shows components of the content server shown in FIG. 8 when the NPD method is used according to another embodiment of the present invention.

FIG. 22 shows components of the content server shown in FIG. 8 when the NPD method is used according to another embodiment of the present invention. As compared to FIG. 9, a null packet deletion module is added.

A null packet deletion module 2200 deletes null packets (for example, PID=819) irrelevant to IPTV service streaming or contents from TS packets incoming from the content server. However, the number of deleted null packets is recorded in a counter and added to an extension header such that a receiver can restore the deleted null packets.

Figure 23:
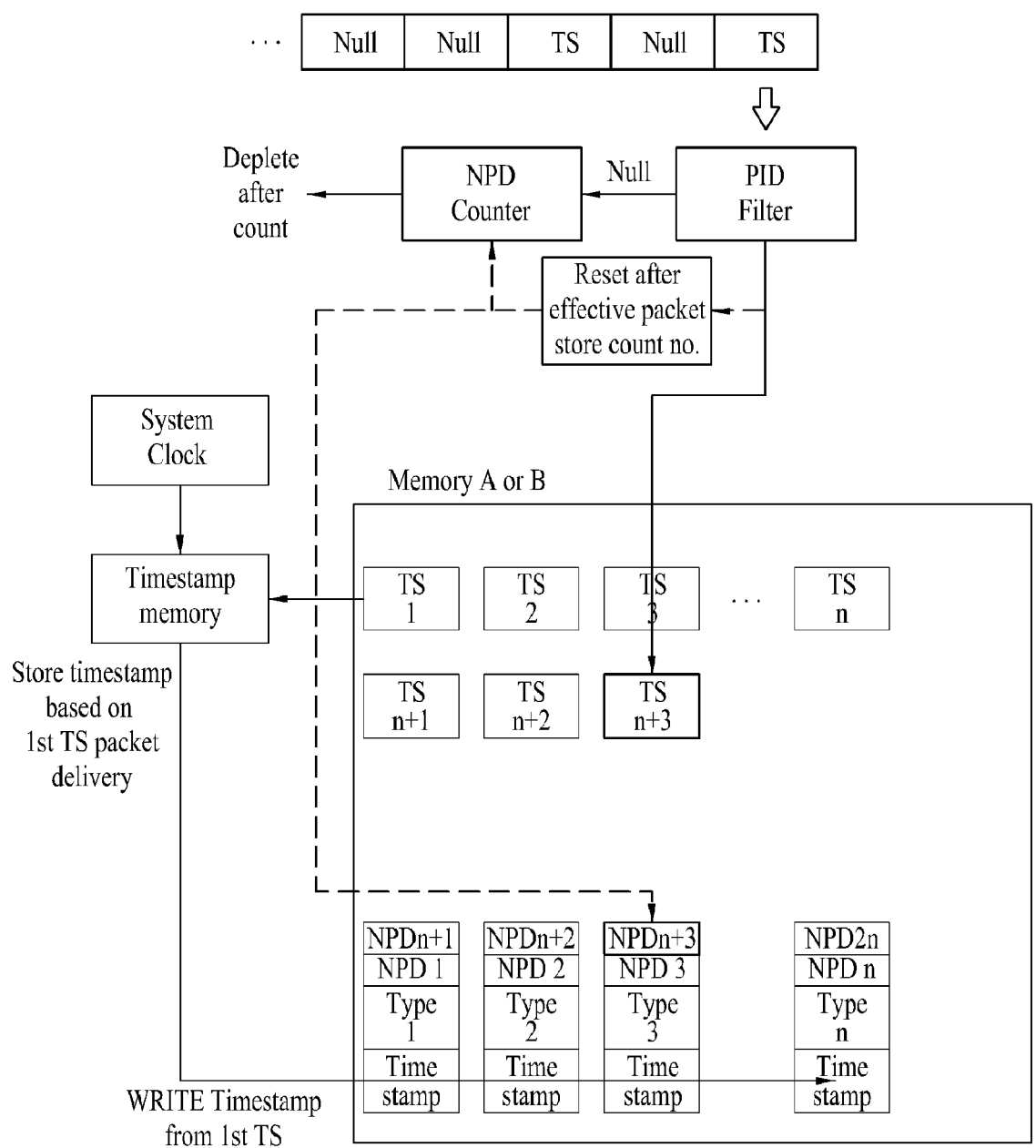
FIG. 23 illustrates an example of a null packet deletion and extension header generating operation according to another embodiment of the present invention.

An extension header generator 2210 generates timestamp generated on the basis of the time of first TS, type information representing locations of n encapsulation payloads, and the deleted null packet count, as shown in FIG. 23.

Figure 24:
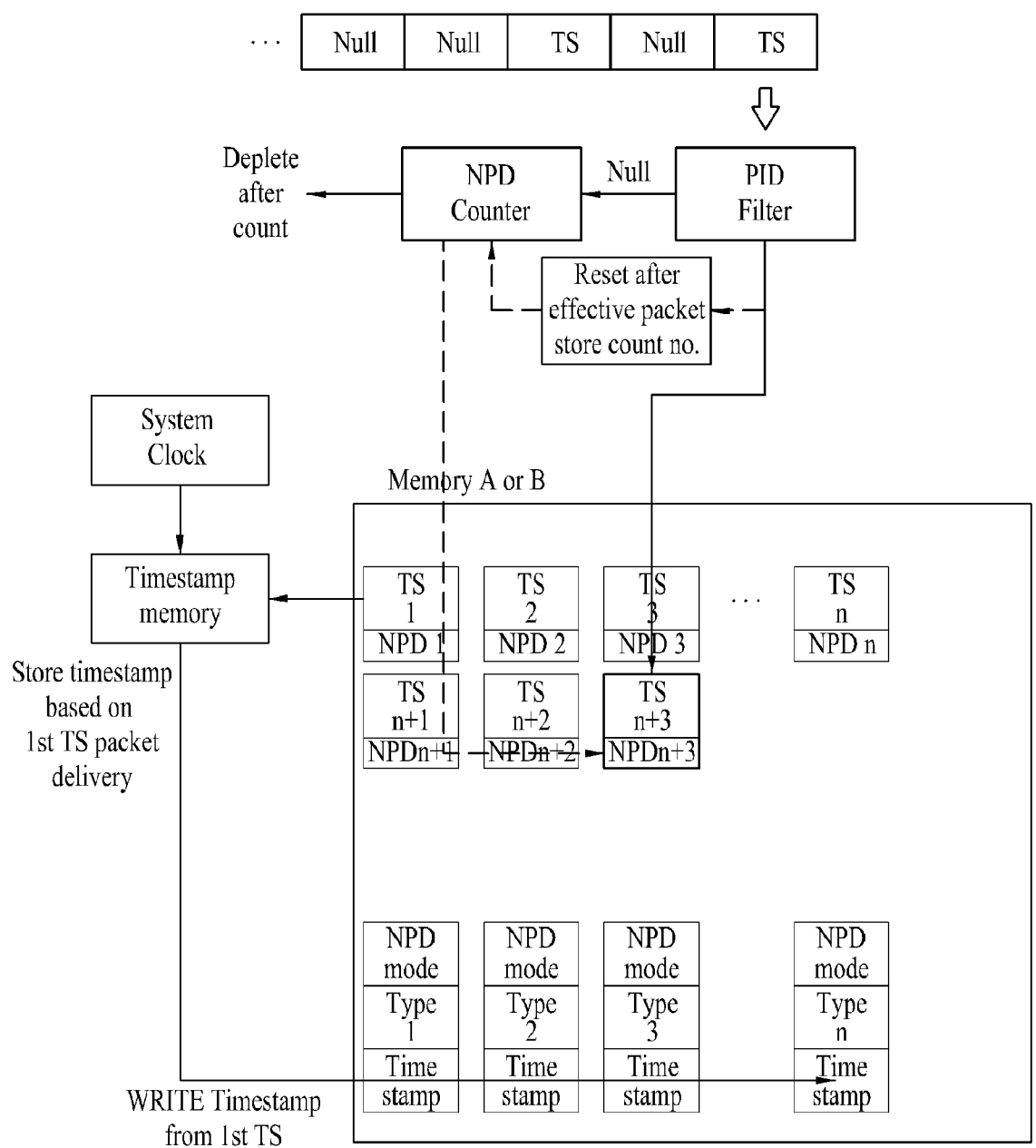
FIG. 24 illustrates another example of the null packet deletion and extension header generating operation according to another embodiment of the present invention.

Otherwise, the extension header generator 2210 adds NPD field (8 bit) instead of header extension after each TS packet, as shown in FIG. 24. In this case, operations of counting and processing the number of null packets are simplified, and processing of extension header can be separated. Accordingly, the location of the extension header generator 2210 shown in FIG. 22 can be adjusted. For example, the extension header generator 2210 can be located following an error check code generator 2220.

Figure 25:
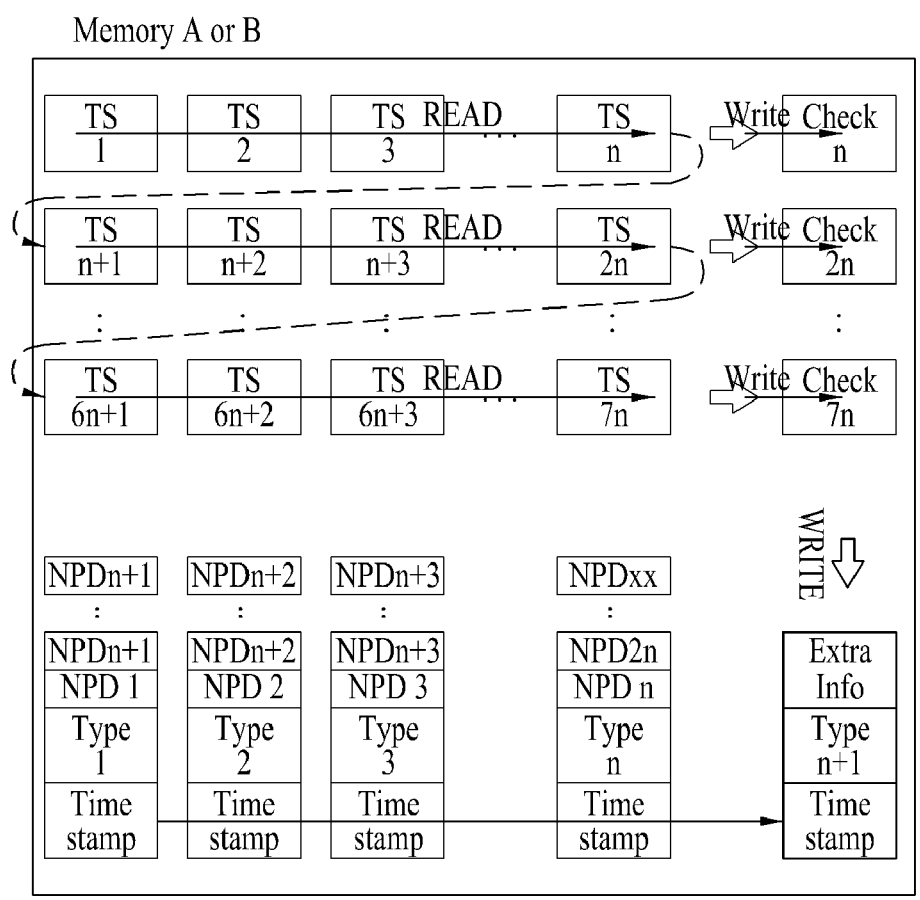
FIG. 25 illustrates an example of an error check code generating operation.

The error check code generator 2220 generates an error detection code such as a parity, CRC, etc. More specifically, as shown in FIG. 25, one error check code is generated for every n TS packets. Accordingly, a receiver can detect an error using the error check code.

Figure 26:
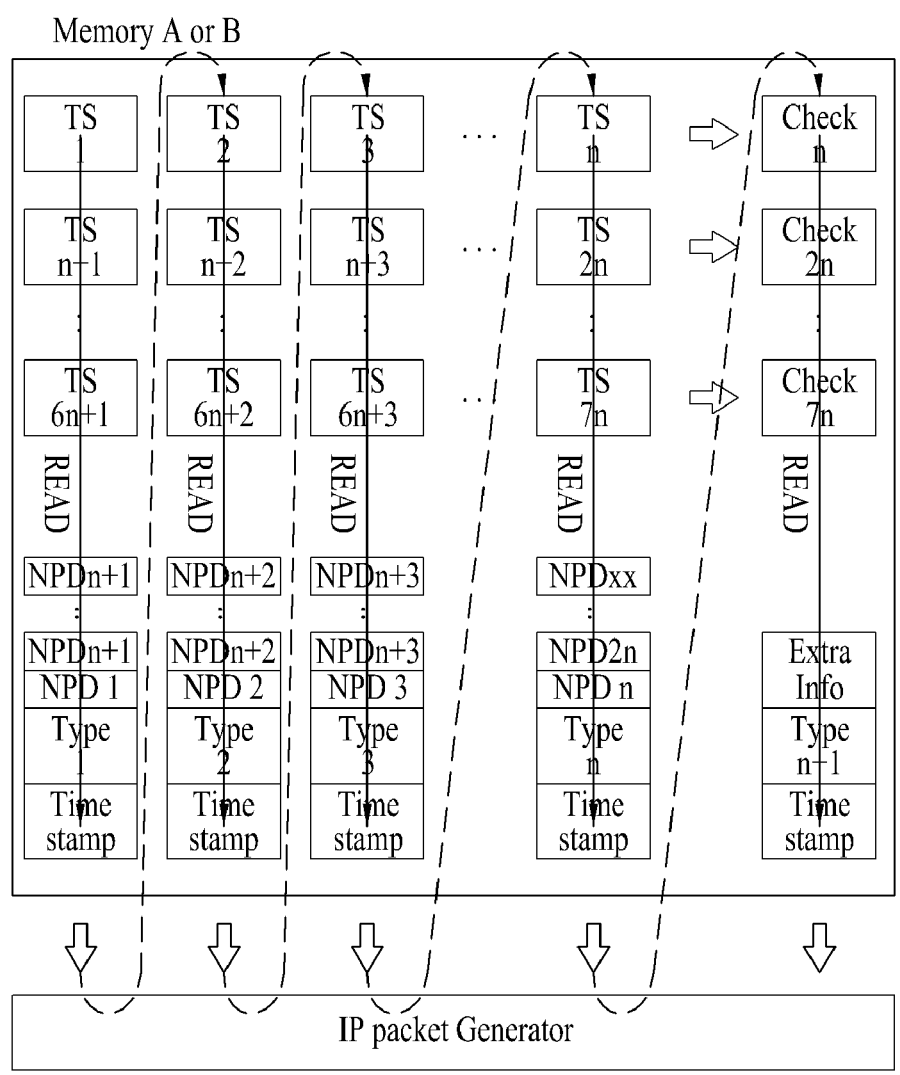
FIG. 26 illustrates an example of a packet interleaved coding operation.

Referring to FIG. 26, a packet interleaved coding module 2230 generates an encapsulation frame composed of seven TS packets of n skipped units from n*7 TS packets.

An IP packet generator 2240 adds an IP header and UDP/TCP header to the generated encapsulation frame to generate an IP packet and transmits the IP packet to a super peer.

When the NPD method is used according to another embodiment of the present invention, as described above, transmission efficiency can be improved and IPTV stream service can be rapidly provided by deleting 10~30% of null packets usually applied to TS streams in advance.

Figure 27:
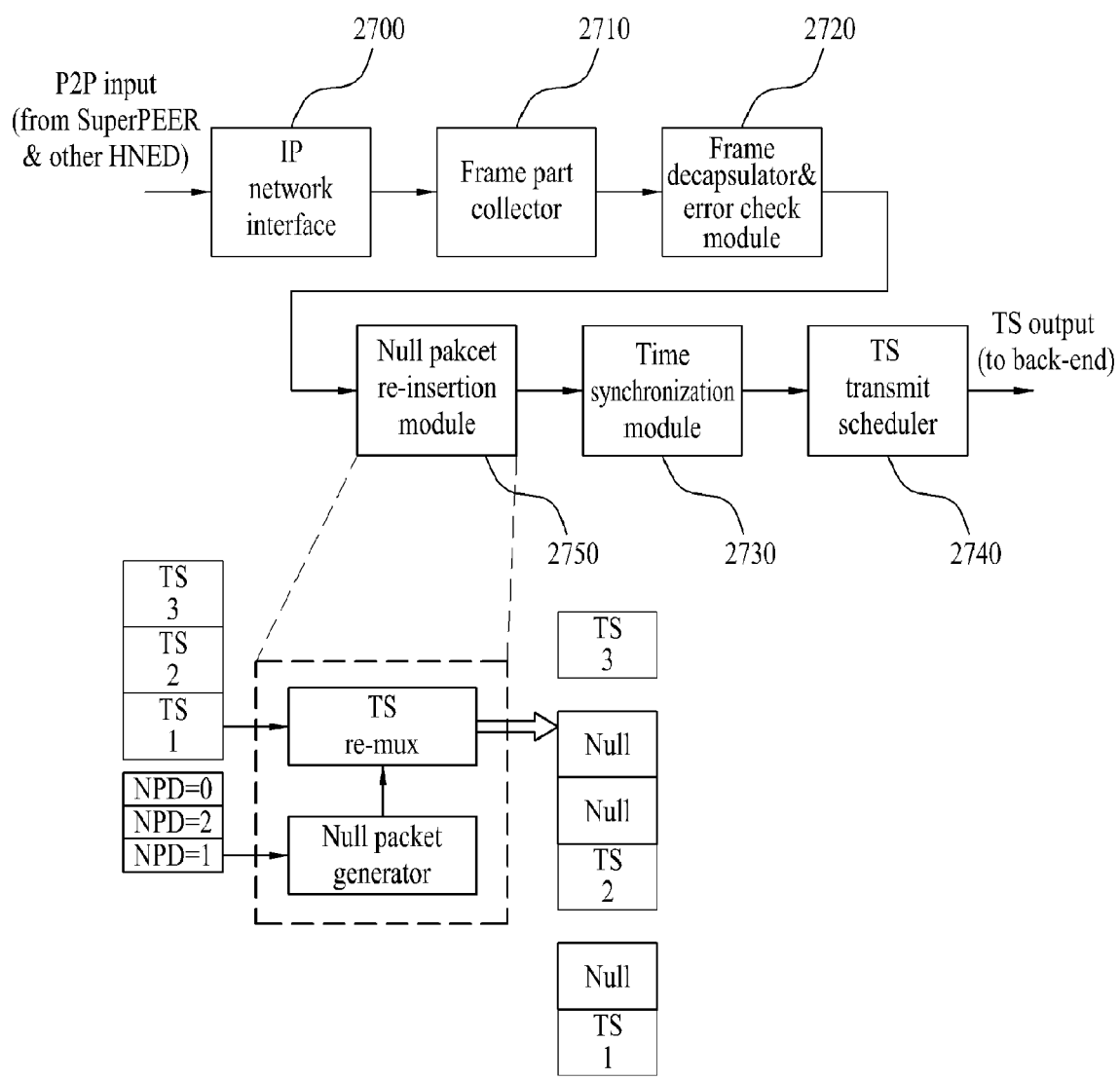
FIG. 27 shows components of the delivery function shown in FIG. 15 when the NPD method is used according to another embodiment of the present invention.

FIG. 27 shows components of the delivery function shown in FIG. 15 when the NPD method is used according to another embodiment of the present invention. As compared to FIG. 16, a null packet re-insertion module is added.

An IP network interface 2700 receives an IP packet from a super peer. A frame part collector 2710 collects P2P streaming encapsulation frames divided for P2P transmission to reconfigure one frame block. That is, the frame part collector 2710 re-arranges encapsulation units (frames) in the original sequence using the above-described timestamp and type information of the extension header.

A frame decapsulator & error check module 2720 decapsulates the frames rearranged in the original sequence and checks error using received parity/CRC, etc.

A null packet re-insertion module 2750 generates null packets on the basis of the deleted null packet count, included in the extension header, and inserts the null packets in a stream.

A time synchronization module 2730 selects a frame block corresponding to timestamp that needs to be decoded on the basis of STC (System Time Clock). A TS transmit scheduler 2740 sequentially transmits TS of the frame block to the system decoder or TS decoder.

Figure 28:
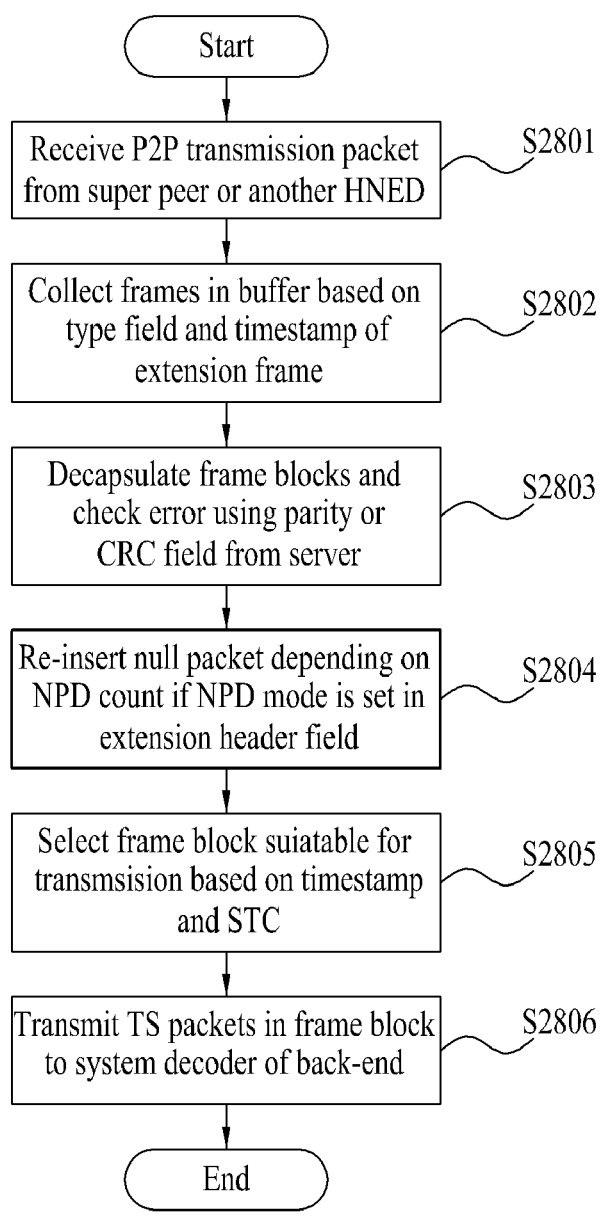
FIG. 28 is a flowchart illustrating a process in which the IPTV system processes an IPTV streaming service by P2P transmission when the NPD method is used according to another embodiment of the present invention.

FIG. 28 is a flowchart illustrating a process in which the IPTV system processes an IPTV streaming service by P2P transmission when the NPD method is used according to another embodiment of the present invention. As compared to FIG. 17, step S2804 is added.

A HNED receives a P2P transmission packet from a super peer or another HNED (S2801). The HNED collects frames in a buffer depending on a type field and timestamp of an extension frame (S2802). The HNED decapsulates frame blocks and performs error check using a parity or CRC field from a server (S2803).

The HNED re-inserts null packets on the basis of NPD count if NPD mode is set in an extension header field (S2804). The HNED selects a suitable frame block to be transmitted depending on timestamp and STC (S2805). The HNED transmits TS packets in the frame block to the system decoder of the back-end (S2806).

A method of providing an IPTV streaming service using an RTP encapsulation method according to another embodiment of the present invention is explained with reference to FIGS. 29 to 43.

Figure 29:
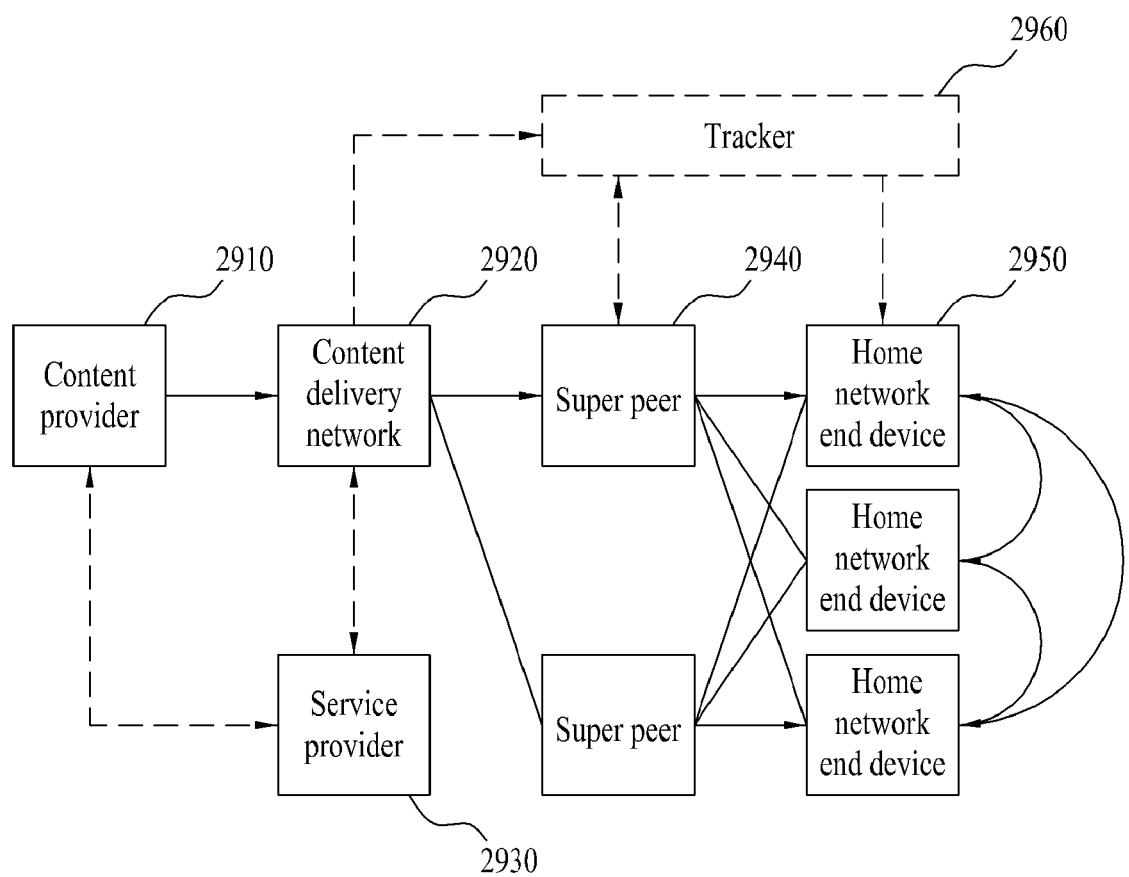
FIG. 29 shows the IPTV system shown in FIG. 2 in more detail.

FIG. 29 shows the IPTV system shown in FIG. 2 in more detail. P2P delivery for IPTV streaming transmission will now be explained with reference to FIG. 29. For reference, a solid line in FIG. 29 denotes data flow and a dotted line denotes control signal flow.

A CP (Content Provider) 2910 provides contents.

A SP (Service Provider) 2930 distributes contents and transmits the contents and a content list. In addition, the SP manages a NC and a super peer.

Furthermore, the SP 2930 provides a content list in the form of SD&S and BCG. This content list may have the form of the metadata shown in FIG. 30.

A CDN (Content Delivery Network) 2920 transmits contents through a network and manages super peers to achieve smooth transmission of the contents.

A tracker 2960 manages transmission ID of contents transmitted through the network, part ID of the contents, peer ID of a receiver, peer priority, access addresses, etc. and shares the information with a super peer or HNED.

A super peer 2940 is managed by the SP and may have a CDN (Content Delivery Network) function. In this case, a large amount of contents can be transmitted to a plurality of receivers.

A HNED (Home Network End Device) 2950 corresponds to a general peer or receiver. The HNED receives an IPTV service list from the SP, selects a specific IPTV service, receives the selected specific IPTV service, and transmits the specific IPTV service to another HNED. The HNED confirms peers and IPTV services which can be received from the peers using the tracker 2960 or a NC (Network Controller) and reports the tracker or NC of information about the received IPTV service. Accordingly, the tracker or NC can manage IPTV service receiving state.

Figure 31:
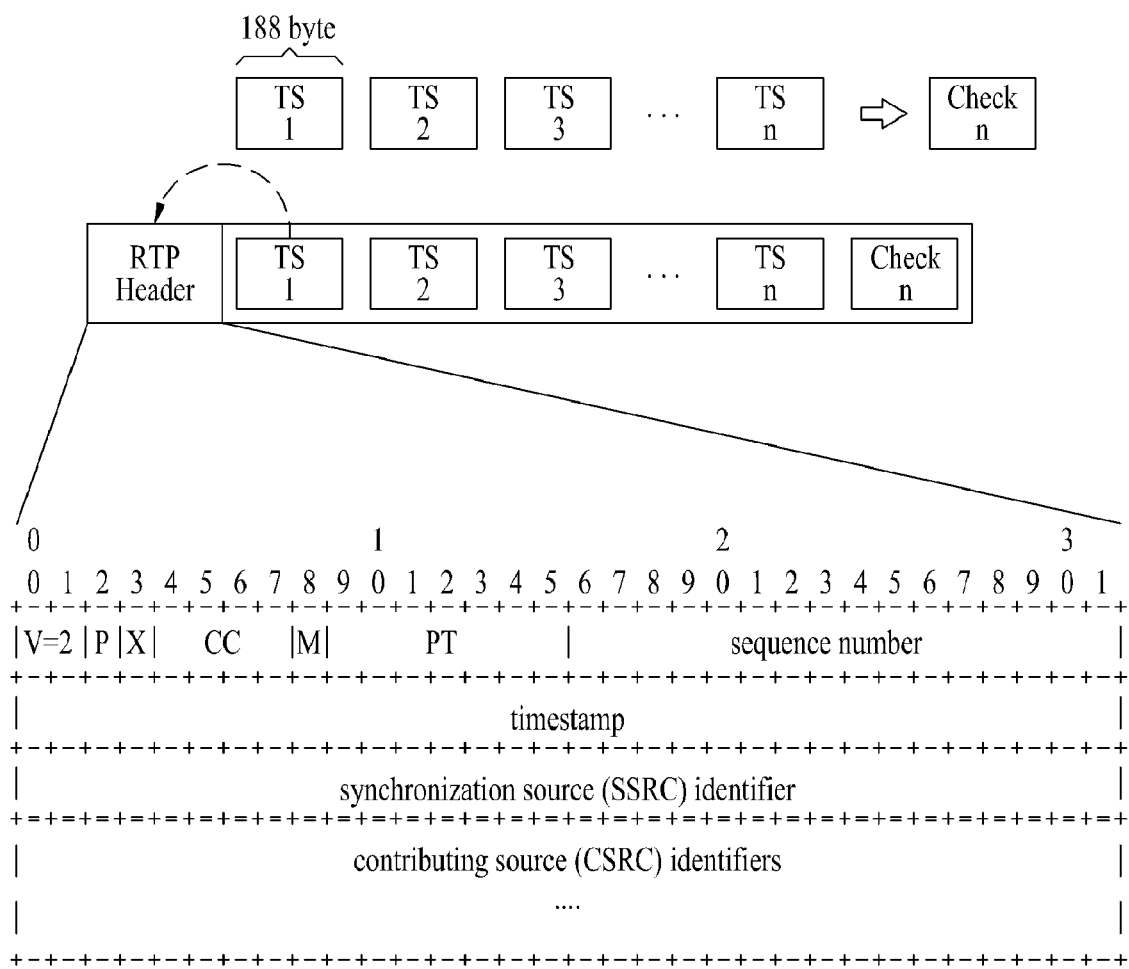
FIG. 31 shows data transmitted from a SP to a super peer, shown in FIG. 29.

FIG. 31 shows data transmitted from the SP shown in FIG. 29 to a super peer.

The SP encapsulates TS packets in a form suitable for P2P delivery in order to transmit contents received from the CP to the P2P network. When the RTP encapsulation method is used, an RTP header is added, as shown in FIG. 31.

More specifically, the SP deletes null packets and temporarily stores a deleted null packet count before an effective packet. The SP arranges TS packets in a predetermined streaming unit (T msec). The streaming unit is related to a broadcast transfer rate, and an appropriate number of super peers are required in order to maintain a transfer rate of a specific level. For example, a number (n) of super peers, as described below, are needed.

$$n=(1000000*R/8)/(188*T/1000) \text{ (R is a transfer rate (Mbps) and T is a streaming rate (msec))}$$

Notably, n+1 super peers are required when a parity/CRC stream for error check is considered.

Furthermore, if an IP packet size is supposed to be 1460 bytes, an encapsulation unit proposed by the present invention includes seven TS packets each having a size of 188 bytes. This is exemplary and can be varied if required. More specifically, the number of TS packets is determined by the following equation.

$$\text{The number of TS packets included in an IP packet} = \text{IP packet size/TS packet size}$$

Accordingly, as described above, if the IP packet size is 1460 bytes and the TS packet size is 188 bytes, the number of TS packets included in an IP packets is approximately 7.766.

Furthermore, the 7n TS packets are arranged in n units to generate an additional stream for a parity or CRC check. In this case, an IPTV receiver can check if received streams have an error.

Furthermore, payloads are generated using TS packet plus NPD (Null Packet Deletion) information grouped in encapsulation units and an RPT header is generated to create RPT packets. To restore the above-mentioned packets in the original sequence at a receiver, a sequence number sequentially increases. The timestamp is determined depending on a time corresponding to the first TS of a payload, to secure compatibility with existing systems.

Finally, the SP codes encapsulation units generated in the above-mentioned steps into IP payloads and transmits the IP payloads to a super peer. The super peer transmits the IP packet to at least one peer through the P2P network.

Figure 32:
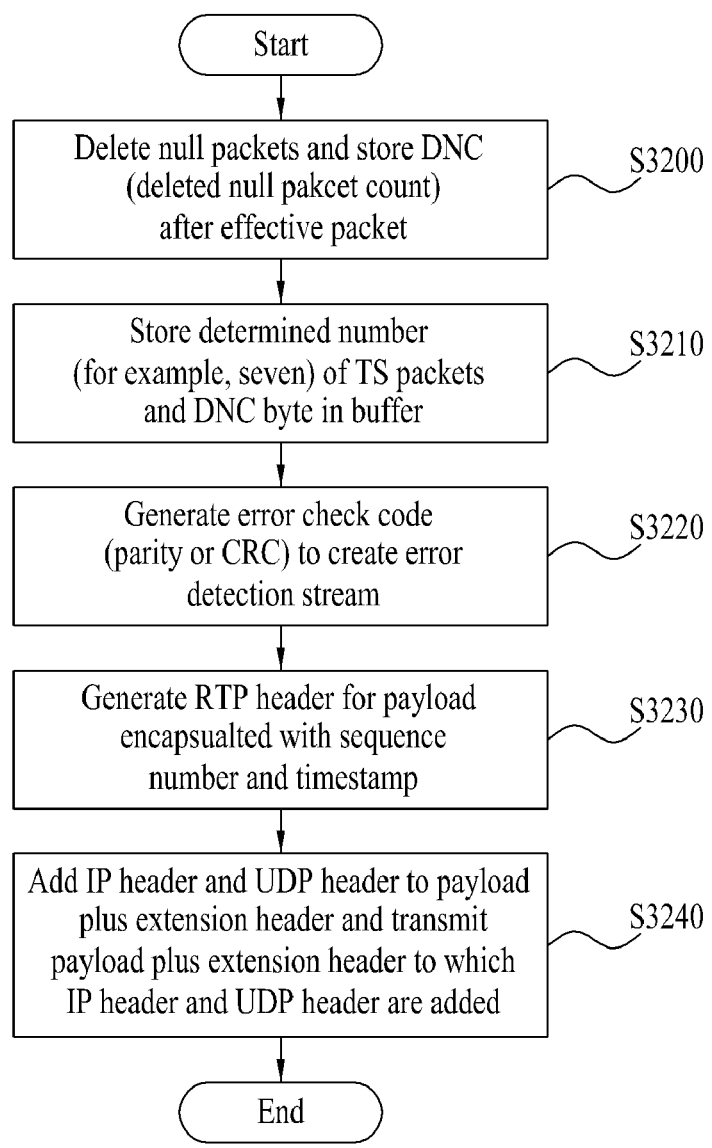
FIG. 32 is a flowchart for subsidiarily explaining FIG. 31.

FIG. 32 is a flowchart for subsidiarily explaining FIG. 31. The data generating process shown in FIG. 31 will now be explained in more detail with reference to FIG. 32.

The SP deletes null packets and stores a deleted null packet count after each effective packet (S3200). The SP stores a determined number (for example, 7) of TS packets and DNC byte in a buffer (S3210). The SP generates an error check code (parity or CRC) to create an error detection stream (S3220).

The SP generates an RTP header for encapsulated payloads with a sequence number and timestamp (S3230). The SP adds an IP header and a UDP header to a payload plus extension header and transmits the payload plus extension header to which the IP header and UDP header are added to a super peer (S3240).

Figure 33:
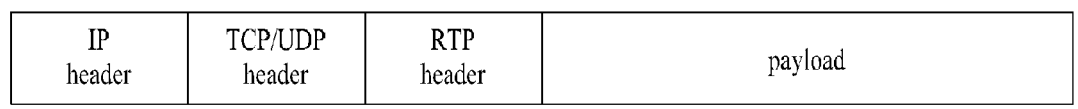
FIG. 33 shows the structure of an IP packet transmitted from the SP to a super peer shown in FIG. 29.

FIG. 33 shows the structure of an IP packet transmitted from the SP shown in FIG. 29 to a super peer.

As shown in FIG. 33, the IP packet is structured in the order of IP header, TCP/UDP header, RTP header and payload. Particularly, an RTP packet part is a basic unit of streaming distributed from the super peer to receivers through the P2P network.

Furthermore, a protocol of data transmitted from CND to a super peer may use UDP or TCP as necessary. For example, UDP is used if rapid data transmission is required. On the contrary, TCP is used when high-reliability data transmission is needed.

Figure 34:
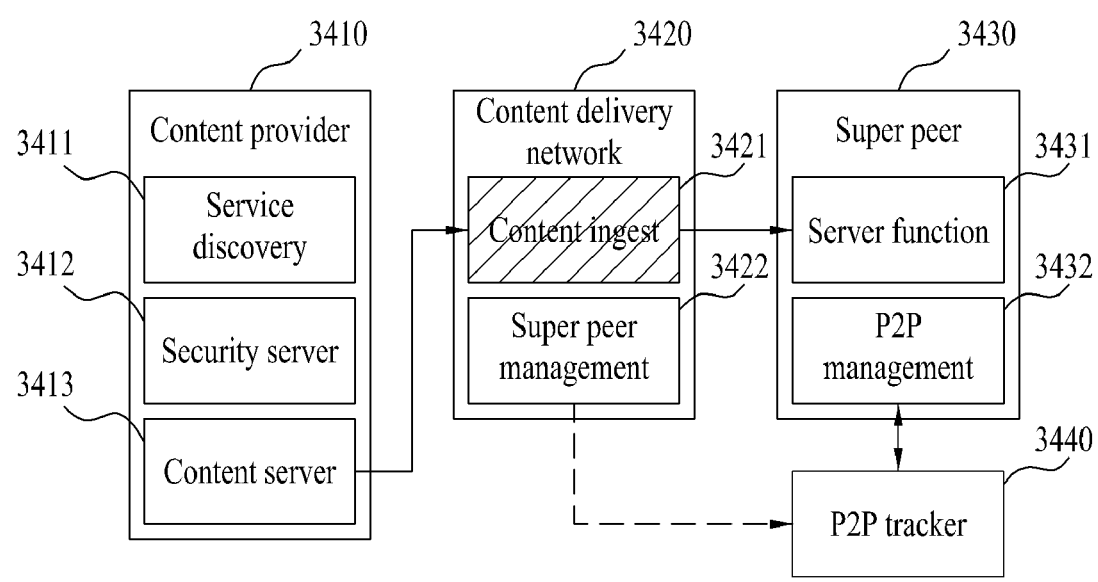
FIG. 34 shows interface among a CP, a CND and a super peer in detail.

FIG. 34 shows interface among a CP, a CND and a super peer in detail.

The CP 3410 provides contents in the form of TS stream. A service discovery 3411 provides a content list and detailed information provided to the user. A security sever 3412 applies a security technique such as DRM to contents. A content server 3413 transmits TS streams to the CDN.

The CDN 3420 manages a network such that contents can be smoothly transmitted to the user, and provides super peer information required for transmission to a tracker.

A content ingest 3421 encodes the TS streams into a form suitable for P2P service and transmits them to the network. That is, the content ingest 3421 transmits contents to a super peer using a CDN function.

A super peer management 3422 provides super peer information required for transmission to the tracker. Exemplary metadata used at this time is shown in FIG. 38.

A P2P tracker 3440 generates an ID (for example, hash code) from encapsulation units generated through the CDN 3420.

A super peer 3430 includes a server function 3431 and a P2P management 3432. The server function 3431 receives content encapsulation frames from the content sever 3413 and transmits the received encapsulation frames to receivers under the control of the P2P tracker 3440.

Figure 41:
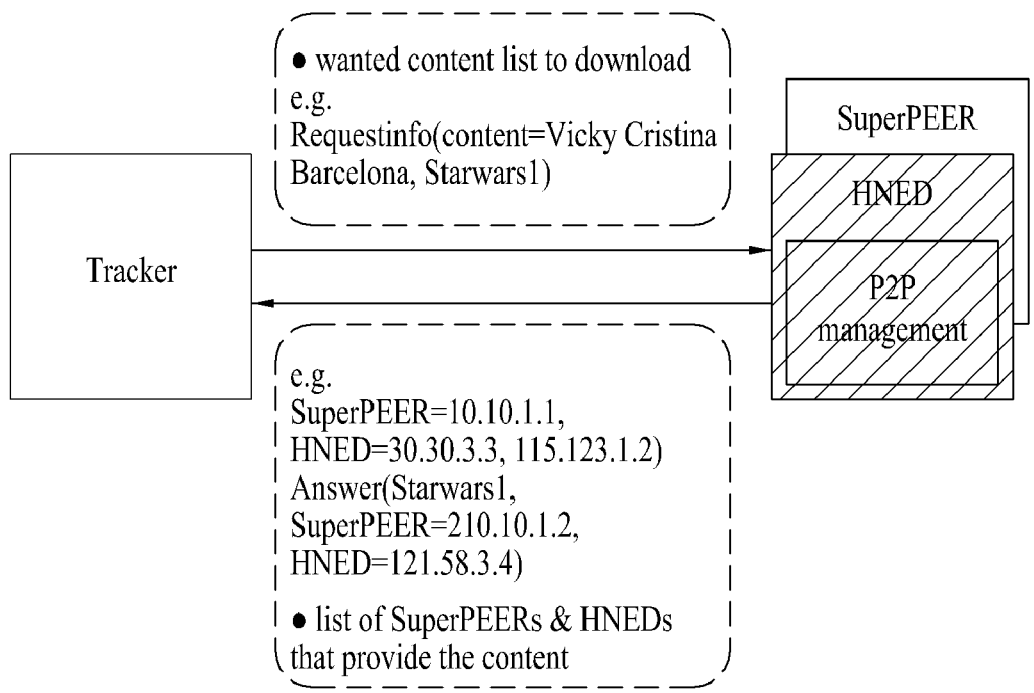
FIG. 41 shows exemplary data that controls P2P streaming when the P2P streaming is transmitted between a P2P tracker and a P2P management of a HNED/super peer.

The P2P management 3432 provides information such as content possession state, upload state, and transfer rate of a super peer to the P2P tracker 3440. For example, if contents are transmitted to another HNED, the P2P management 3432 transits information about the transmitted contents to the P2P management of the HNED. Exemplary information transmitted at this time is shown in FIG. 41.

Figure 35:
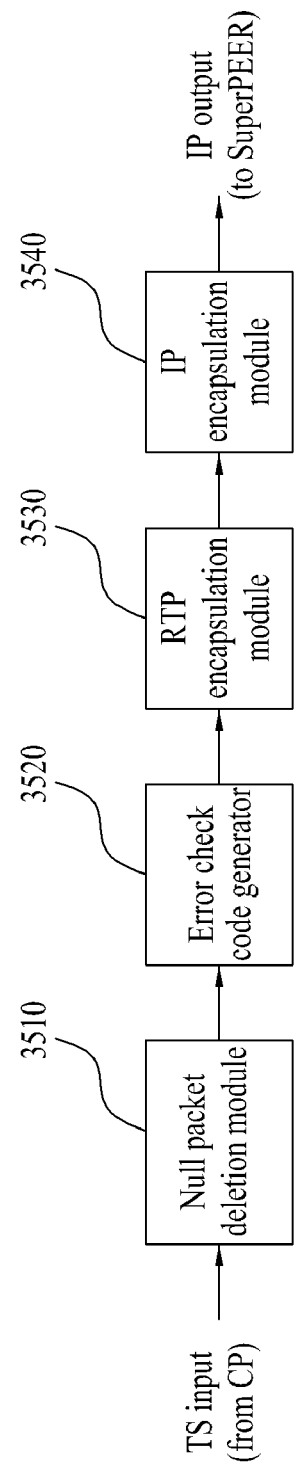
FIG. 35 shows content ingest of the CDN shown in FIG. 34 in more detail.
Figure 36:
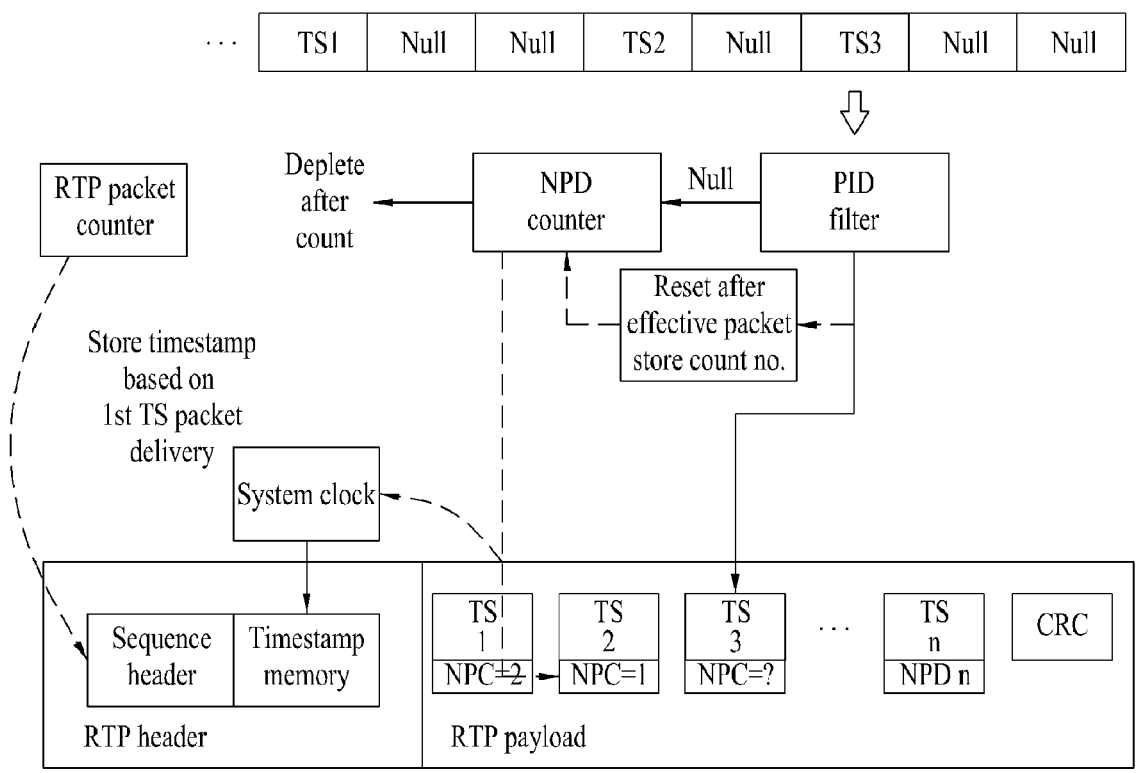
FIG. 36 illustrates a null packet deletion and RTP encapsulation operation.

FIG. 35 shows the content ingest of the CDN shown in FIG. 34 in more detail.

As shown in FIG. 35, a NPD (Null Packet Deletion) module 3510 deletes null packet (for example, PID corresponds to 819) irrelative to contents from TS packets incoming from the content server. The NPD module 3510 records a deleted null packet count in a counter, substitutes the null packet count by a NPC (Null Packet Count) byte and inserts the NPC byte into the TS packets. Accordingly, a receiver can restore the original information using the NPC byte.

An error check code generator 3520 generates an error detection code such as parity, CRC, etc. For example, n TS packets are generated and a stream for error detection is added to the TS packets such that the receiver can perform error detection later.

An RTP encapsulation module 3530 generates an RTP header on the basis of a sequence number representing a packet sequence and timestamp generated based on the time of the first TS. The RTP encapsulation module 3530 adds a payload composed of TS plus NPC bytes to the generated RTP header to create an RTP packet. This process is shown in FIG. 536.

An IP encapsulation module 3540 adds an IP header and a UDP/TCP header to encapsulation frames generated according to the above-mentioned method to generate an IP packet and transmits the IP packet to a super peer.

Figure 37:
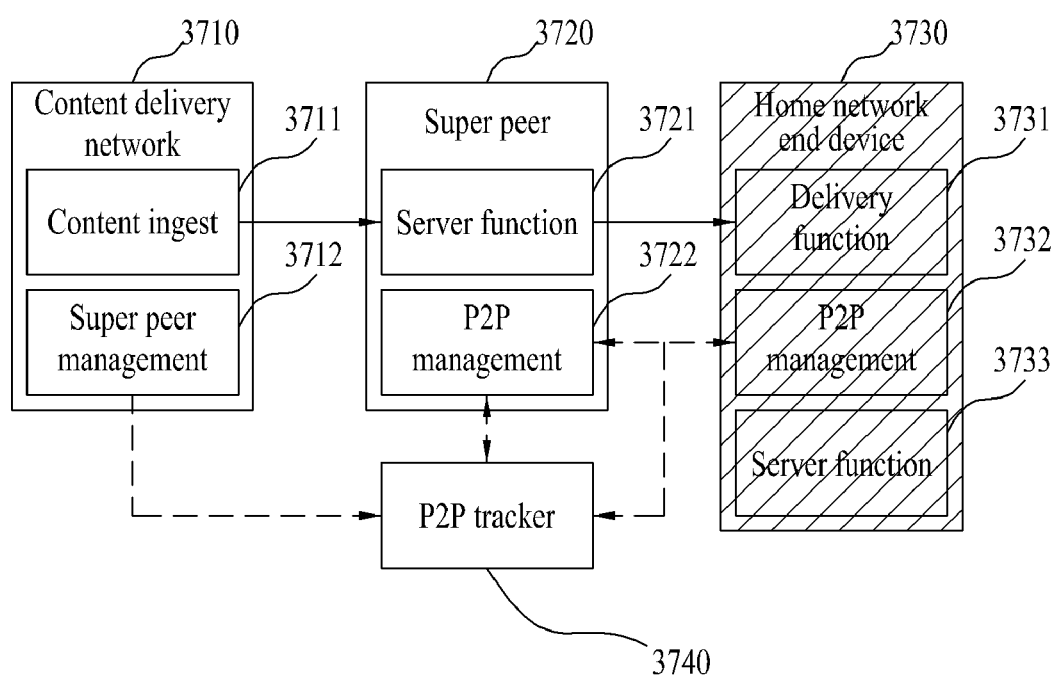
FIG. 37 shows interface between a super peer and s HNED in detail.

FIG. 37 shows an interface between a super peer and a HNED in detail.

A CDN 3710 manages a network such that contents can be smoothly transmitted to the user and provides super peer information required for transmission to a tracker.

A content ingest 3711 encodes TS streams into a form suitable for P2P service and transmits them to the network. That is, the content ingest 3711 transmits contents to a super peer using the CDN function.

A super peer management 3712 provides super peer information required for transmission to the tracker. Exemplary metadata used at this time is shown in FIG. 38.

A P2P tracker 3740 generates an ID (for example, hash code) from encapsulation units generated through the CDN 3710.

A super peer 3720 includes a server function 3721 and a P2P management 3722. The server function 3721 receives content encapsulation frames from the content sever and transmits the received encapsulation frames to receivers under the control of the P2P tracker 3740.

The P2P management 3722 provides information such as content possession state, upload state, and transfer rate of a super peer to the P2P tracker 3740. For example, if contents are transmitted to another HNED, the P2P management 3432 transits information about the transmitted contents to the P2P management of the HNED. Exemplary information transmitted at this time is shown in FIG. 41.

A HNED 3730 includes a delivery function 3731, a P2P management 3732 and a server function 3733.

The delivery function 3731 receives contents from super peers or other HNEDs under the control of the P2P tracker 3740.

The P2P management 3733 provides information such as content possession state, upload state and transfer rate of the HNED 3730 to the P2P tracker 3740.

The server function 3733 transmits contents possessed by the HNED 3730 to other receivers under the control of the P2P tracker 3740.

Figure 39:
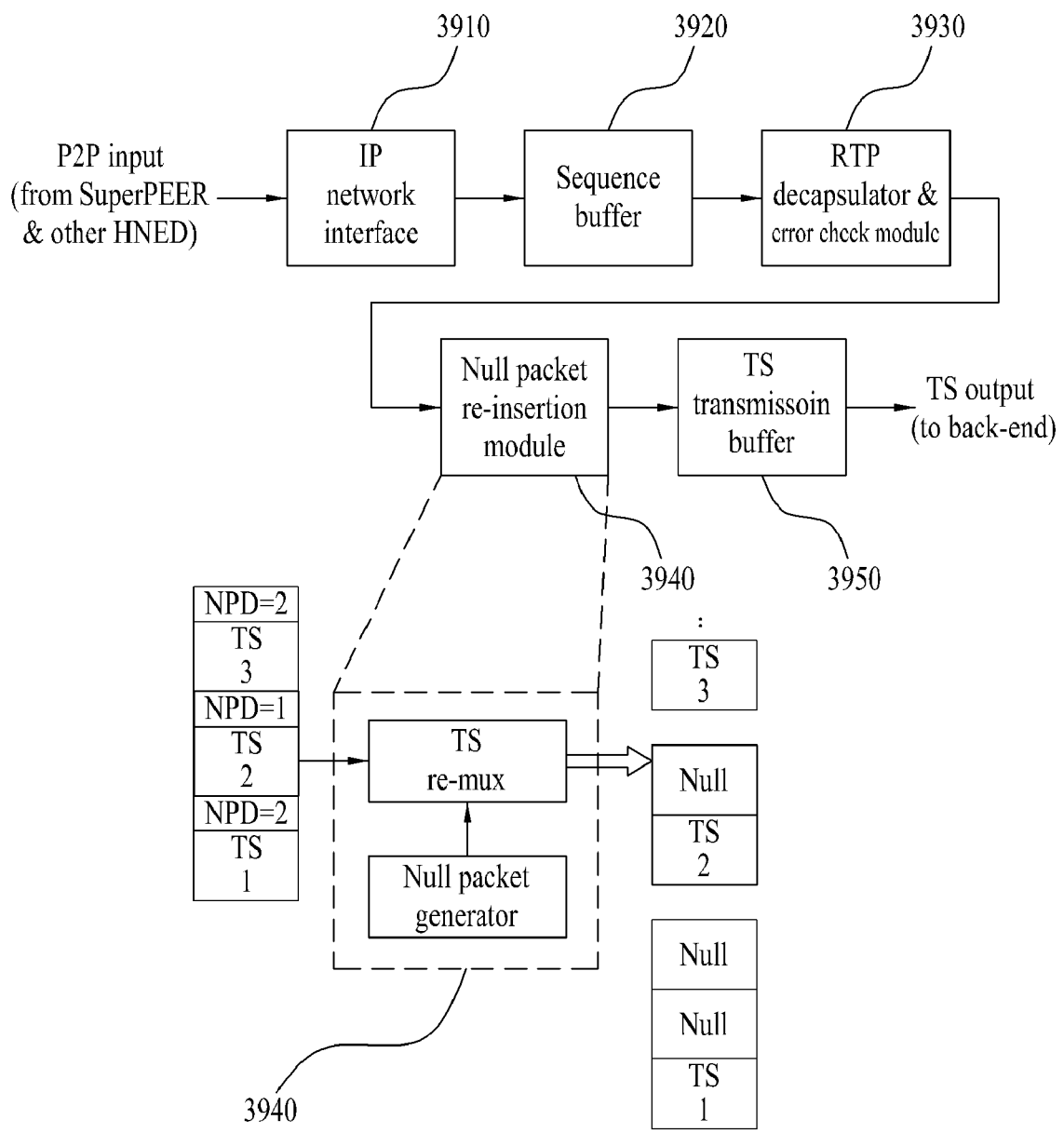
FIG. 39 shows a delivery function shown in FIG. 37 in more detail.

FIG. 39 shows the delivery function shown in FIG. 37 in more detail. Blocks shown in FIG. 39 may correspond to the network interface shown in FIG. 14.

An IP network interface 3910 receives IP packets from super peers or peers. A sequence buffer 3920 buffers RTP packets transmitted for P2P delivery in order.

An RTP decapsulation & error check module 3930 decapsulates the RPT packets and performs error check using parity/CRC information transmitted with the RTP packets.

A null packet re-insertion module 3940 generates null packets on the basis of NPC (Null Packet Count) information of RTP payload and inserts the null packets into streams. This is shown in the bottom part of FIG. 39.

A TS transmit buffer 3950 transmits TS of frame blocks to a system decoder or a TS decoder in synchronization with a clock signal.

Operations of the modules shown in FIG. 39 will now be explained with reference to FIG. 40.

Figure 40:
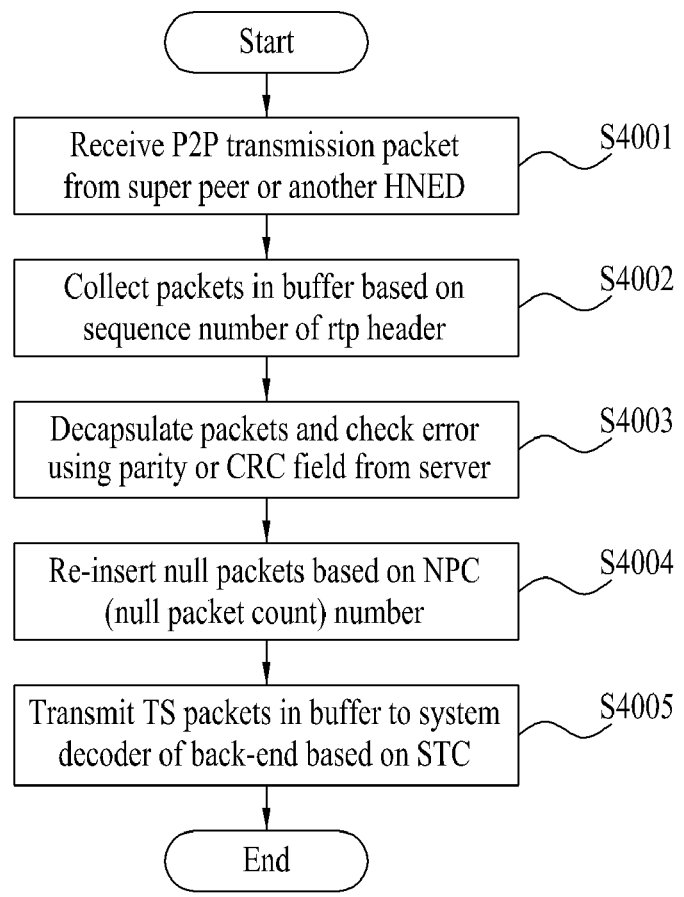
FIG. 40 illustrates a process in which a HNED receives a packet transmitted by P2P delivery according to another embodiment of the present invention.

FIG. 40 shows a process in which a HNED receives a packet transmitted by P2P delivery according to another embodiment of the present invention in more detail.

The HNED receives P2P transmission packets from a super peer or another HNED (S4001). The HNED collects the packets in a buffer depending on a sequence number of an RTP header (S4002). The HNED decapsulates the packets and performs error check using a parity or CRC field from a server (S4003).

The HNED re-inserts null packets into streams on the basis of a NPC (Null Packet Count) (S4004). The HNED transmits TS packets in the buffer to the system decoder of the back-end on the basis of STC (S4005).

FIG. 41 shows an example of data that controls P2P streaming when the P2P streaming is transmitted between a P2P tracker and a P2P management of a HNED/super peer.

As shown in FIG. 41, when the HNED/super peer requests the P2P tracker to provide a list of contents that the HNED/super peer wants to receive, the P2P tracker transmits a list of HNEDs/super peers that possess the contents to the HNED/super peer.

Figure 42:
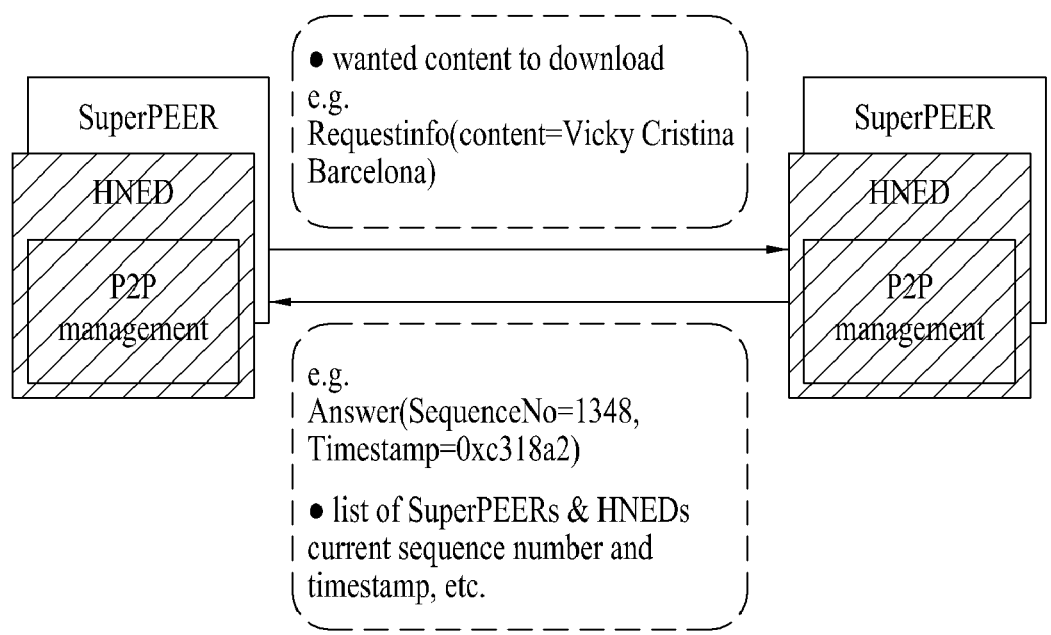
FIG. 42 shows exemplary data that controls P2P streaming when the P2P streaming is transmitted between a P2P management of a HNED/super peer and a P2P management of another HNED/Super peer.

FIG. 42 shows an example of data that controls P2P streaming when the P2P streaming is transmitted between a P2P management of a HNED/super peer and a P2P management of another HNED/super peer.

As shown in FIG. 42, the HNED/super peer accesses the corresponding HNED/super peer and requests the corresponding HNED/super peer to provide information about desired contents. The requested corresponding HNED/super peer transmits information (for example, sequence number, timestamp, part index, etc.) about the current state of possessed contents to the HNED/super peer.

If the connection of the HNED/super peer and the other HNED/super peer is disconnected while the HNED/super peer is receiving packets from the other HNED/super peer, the HNED/super peer can be immediately connected to another HNED/super peer having the same packets. This is because the HNED/super peer already received the list of HNEDs/super peers which can possess and transmit the same packets, as shown in FIG. 41. This will be explained in more detail with reference to FIG. 43.

Figure 43:
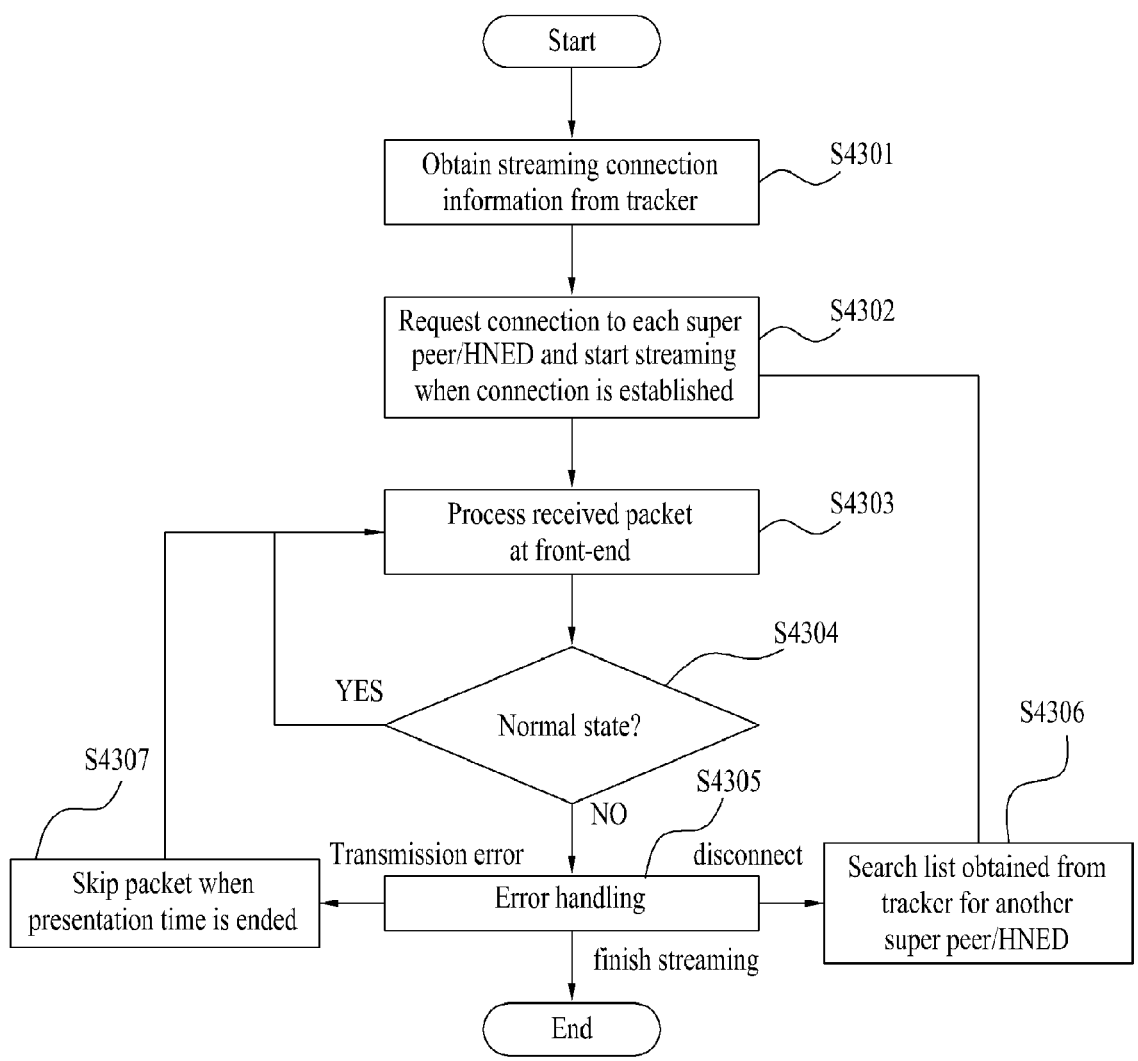
FIG. 43 is a flowchart illustrating a process of automatically searching new connection when disconnection occurs while an IPTV system according to another embodiment of the present invention receives an IPTV streaming service by P2P transmission.

FIG. 43 is a flowchart illustrating a process of automatically searching for new connection when disconnection occurs while the IPTV system according to another embodiment of the present invention is receiving an IPTV streaming service by P2P delivery. The process of automatically searching for new connection when disconnection occurs while the IPTV system according to another embodiment of the present invention is receiving an IPTV streaming service by P2P delivery will now be explained with reference to FIG. 43.

A HNED (for example, peer, IPTV) obtains streaming connection information from the tracker (S4301). The HNED requests connection to each super peer/HNED and starts streaming if connection is established (S4302). The HNED processes received packets at the front-end (S4303).

The HNED determines whether or not the packets are normal (S4304). The HNED performs error handling (S4305). The HNED searches a list obtained from the tracker for another super peer/HNED (S4306). The HNED skips packets if presentation time is ended (S4307).

The method according to the present invention can be embodied as computer readable code on a computer readable medium. The computer readable medium includes program commands, data files, data structure, etc. alone or in combination. Program commands recorded on the computer readable medium may be specially designed and constructed for the present invention, or known to those skilled in the computer software field and used. Examples of the computer readable medium include magnetic media such as hard disk, floppy disk, and magnetic tape, optical media such as CD-ROM and DVD, magneto-optical media such as floptical disk, and hardware devices specially constructed to store and execute the program commands, such as ROM, RAM, flash memory, etc. Examples of the program commands include not only machine language code generated by a compiler but also high-level language code executable by a computer using an interpreter. The hardware devices can be constructed such that they operate as one or more software modules to perform operations of the present invention and vice versa.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

MODE FOR CARRYING OUT THE INVENTION

As described above, related details are described in the best mode for carrying out the invention.

INDUSTRIAL APPLICABILITY

As described above, the present invention can be applied to a digital broadcast system partially or overall.

The invention claimed is:

1. An apparatus for transmitting an IPTV streaming service by P2P transmission, comprising:
   a first generator to collect m*n TS packets to generate n encapsulation units for the IPTV streaming service (where m and n are natural numbers);
   an error check code generator to generate an error detecting stream packet including error check codes, wherein each of the error check codes are generated for every n TS packets;
   a first controller to add an extension header containing type information to the generated encapsulation units and the generated error detecting stream packet, wherein the type information includes information for identifying the order of the encapsulation units, which is required for decoding the IPTV streaming service, information for representing a super peer to which the one of the generated encapsulation units or the generated error detecting stream packet is to be transmitted and information for identifying the error detecting stream packet;
   a second generator to add an IP header to the encapsulation unit and the error detecting stream packet to which the extension header containing the type information is added, in order to generate an IP packet; and
   a transmitter to transmit the generated IP packet to corresponding super peer based on the type information by unicast.

2. The apparatus according to claim 1, wherein the first generator arranges the m*n TS packets in m*n matrix having m rows and n columns,
   wherein the first generator arranges the TS packets in each of rows from the first column to the nth column in order,
   wherein the first generator arranges the TS packets from the first row to the mth row in order; and
   collects m TS packets in the same column to generate one of n encapsulation units.

3. The apparatus according to claim 1, wherein n is calculated by n=(1000000*R/8)/(188*T/1000) (R is a transfer rate (Mbps) and T is a streaming rate (msec)).

4. The apparatus according to claim 1, further comprising a second controller to arrange the TS packets in n units and deleting null packets irrelevant to the IPTV streaming service.

5. The apparatus according to claim 4, wherein the extension header contains NPD (Null Packet Deletion) information containing the number of the deleted null packets.

6. The apparatus according to claim 1, wherein the natural number m is a natural number which is equal to or less than a number which is calculated by dividing IP packet size by TS packet size.

7. An apparatus for receiving an IPTV (Internet Protocol Television) streaming service by P2P (Peer to Peer) transmission comprising:
   an IP network interface to receive IP packets including n encapsulation units for the IPTV streaming service and an error detecting stream packet including error check codes from a super peer or peer, wherein each of the error check codes are generated for every n TS packets, wherein each of the encapsulation units and the error detecting stream packet include an extension header containing type information and an IP header,
   wherein the type information includes information for identifying the order of the encapsulation units, which is required for decoding the IPTV streaming service, information for representing a super peer to which the one of the encapsulation units or the error detecting stream packet is to be transmitted and information for identifying the error detecting stream packet;
   a controller to rearrange the n encapsulation units in an original order by using the type information; and
   a system decoder to decode TS packets constructing the n encapsulation units to output the IPTV streaming service.

8. The apparatus according to claim 7, wherein the extension header contains NPD (Null Packet Deletion) information containing a deleted null packet count.

9. The apparatus according to claim 8, wherein the controller comprises:
   a null packet generator to generate null packets on the basis of the NPD information; and
   a TS remultiplexer to multiplex the generated null packets and the TS packets.

10. The apparatus according to claim 7, wherein the IP network interface receives a list of other super peers or peers which possess the currently received encapsulation unit from a network controller;
    connects to the other super peer or peer if an error is generated while the encapsulation unit is being received; and
    re-receives the encapsulation unit from the connected other super peer or peer.

11. The apparatus according to claim 7, wherein the peer corresponds to a HNED (Home Network End Device) or DTV.

12. The apparatus according to claim 7, wherein the n encapsulation units including m*n TS packets, wherein m and n are natural numbers.

13. The apparatus according to claim 12, wherein n is calculated by n=(1000000*R/8)/(188*T/1000) (R is a transfer rate (Mbps) and T is a streaming rate (msec)).

14. The apparatus according to claim 12, wherein the natural number m is a natural number which is equal to or less than a number which is calculated by dividing IP packet size by TS packet size.

* * * * *